United States Patent
Mendez et al.

(10) Patent No.: US 10,614,619 B2
(45) Date of Patent: Apr. 7, 2020

(54) GRAPHICS PROCESSING SYSTEMS

(71) Applicant: ARM Limited, Cambridge (GB)

(72) Inventors: Roberto Lopez Mendez, Cambridge (GB); Sylwester Krzysztof Bala, Cambridge (GB); Samuel Paul Laynton, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/551,846

(22) PCT Filed: Feb. 26, 2016

(86) PCT No.: PCT/GB2016/050498
§ 371 (c)(1),
(2) Date: Aug. 17, 2017

(87) PCT Pub. No.: WO2016/135498
PCT Pub. Date: Sep. 1, 2016

(65) Prior Publication Data
US 2018/0033191 A1 Feb. 1, 2018

(30) Foreign Application Priority Data

Feb. 27, 2015 (GB) .................................. 1503386.3
Feb. 27, 2015 (GB) .................................. 1503391.3

(51) Int. Cl.
*G06T 15/50* (2011.01)
*G06T 15/06* (2011.01)
(Continued)

(52) U.S. Cl.
CPC .......... *G06T 15/506* (2013.01); *G06T 15/005* (2013.01); *G06T 15/04* (2013.01);
(Continued)

(58) Field of Classification Search
None
See application file for complete search history.

(56) References Cited

U.S. PATENT DOCUMENTS

| 5,870,097 A | 2/1999 | Snyder |
| 6,563,508 B1 | 5/2003 | Oka |

(Continued)

FOREIGN PATENT DOCUMENTS

| CA | 2737575 | 10/2012 |
| EP | 1508877 | 2/2005 |

(Continued)

OTHER PUBLICATIONS

Chris Wyman, "An Approximate Image-Space Approach for Interactive Refraction", Jul. 2005, ACM, ACM Transactions on Graphics (TOG), vol. 24 Issue 3, pp. 1050-1053.*

(Continued)

*Primary Examiner* — Robert Bader
(74) *Attorney, Agent, or Firm* — Vierra Magen Marcus LLP

(57) ABSTRACT

In a graphics processing system, a bounding volume (20) representative of the volume of all or part of a scene to be rendered is defined. Then, when rendering an at least partially transparent object (21) that is within the bounding volume (20) in the scene, a rendering pass for part or all of the object (21) is performed in which the object (21) is rendered as if it were an opaque object. In the rendering pass, for at least one sampling position (23) on a surface of the object (21), the colour to be used to represent the part of the refracted scene that will be visible through the object (21) at the sampling position (23) is determined by using a view vector (24) from a viewpoint position (25) for the scene to determine a refracted view vector (26) for the sampling position (23), determining the position 28 on the bounding volume (20) intersected by the refracted view vector (26), using the intersection position (28) to determine a vector (29) to be used to sample a graphics texture that represents the colour of the surface of the bounding volume (20) in the scene, and using the determined vector (29) to sample the graphics texture to determine a colour for the sampling (Continued)

position (23) to be used to represent the part of the refracted scene that will be visible through the object (21) at the sampling position (23) and any other relevant information encoded in one or more channels of the texture.

19 Claims, 12 Drawing Sheets

(51) Int. Cl.
```
    G06T 15/00      (2011.01)
    G06T 15/04      (2011.01)
    G06T 15/20      (2011.01)
    G06T 19/20      (2011.01)
    G06T 13/20      (2011.01)
    G06T 15/80      (2011.01)
```
(52) U.S. Cl.
CPC .............. *G06T 15/06* (2013.01); *G06T 15/20* (2013.01); *G06T 15/503* (2013.01); *G06T 19/20* (2013.01); *G06T 13/20* (2013.01); *G06T 15/80* (2013.01); *G06T 2210/12* (2013.01); *G06T 2210/21* (2013.01); *G06T 2210/62* (2013.01); *G06T 2219/2012* (2013.01)

(56) References Cited

U.S. PATENT DOCUMENTS

| | | | |
|---|---|---|---|
| 6,876,362 | B1 | 4/2005 | Newhall |
| 6,999,078 | B1 | 2/2006 | Akerman |
| 6,999,080 | B1* | 2/2006 | Ungar ............... G06T 15/506 345/426 |
| 7,675,518 | B1 | 3/2010 | Miller |
| 8,773,433 | B1 | 7/2014 | Smyrl |
| 9,280,848 | B1 | 3/2016 | Chen |
| 9,741,159 | B2 | 8/2017 | Hazel |
| 9,842,424 | B2 | 12/2017 | Hecht |
| 2002/0018063 | A1 | 2/2002 | Donovan |
| 2003/0052891 | A1 | 3/2003 | Bragg |
| 2003/0085895 | A1* | 5/2003 | Oka .................... A63F 13/10 345/426 |
| 2005/0041023 | A1 | 2/2005 | Green |
| 2005/0093857 | A1 | 5/2005 | Wang et al. |
| 2006/0274065 | A1 | 12/2006 | Buyanovskiy |
| 2006/0279570 | A1 | 12/2006 | Zhou |
| 2007/0139408 | A1* | 6/2007 | Keranen ............. G06T 15/50 345/426 |
| 2007/0257911 | A1 | 11/2007 | Bavoil |
| 2008/0024491 | A1 | 1/2008 | Sathe et al. |
| 2009/0213144 | A1 | 8/2009 | Dokken et al. |
| 2010/0134516 | A1 | 6/2010 | Cooper |
| 2010/0295851 | A1 | 11/2010 | Diamond |
| 2012/0094773 | A1 | 4/2012 | Suzuki |
| 2015/0228110 | A1 | 8/2015 | Hecht |
| 2015/0269768 | A1 | 9/2015 | Sohn et al. |
| 2017/0069129 | A1 | 3/2017 | Mendez et al. |
| 2017/0161917 | A1 | 6/2017 | Bala et al. |

FOREIGN PATENT DOCUMENTS

| | | |
|---|---|---|
| GB | 2528655 A | 2/2016 |
| GB | 2543766 A | 5/2017 |
| JP | 2011-1138445 A | 7/2011 |
| KR | 100700307 B1 | 3/2007 |
| WO | WO 2008/037599 | 4/2008 |
| WO | 2017072476 A1 | 5/2017 |

OTHER PUBLICATIONS

Chris Wyman, "An Approximate Image-Space Approach for Interactive Refraction", Jul. 2005, ACM, ACM Transactions on Graphics (TOG), vol. 24 Issue 3, Presentation Video, https://dl.acm.org/ft_gateway.cfm?id=1073310&ftid=979647&dwn=1.*

Chris Wyman, "Interactive Image-Space Refraction of Nearby Geometry", Dec. 2, 2005, ACM, Proceeding GRAPHITE '05 Proceedings of the 3rd international conference on Computer graphics and interactive techniques in Australasia and South East Asia, pp. 205-211.*

Chris Brennan, "Accurate Reflections and Refractions by Adjusting for Object Distance", 2002, Wordware Publishing, Inc., Direct3D ShaderX: Vertex and Pixel Shader Tips and Tricks, ed. Wolfgang F. Engel, pp. 290-294.*

Stefan Seipel, Anders Nivfors, "Efficient Rendering of Multiple Refractions and Reflections in Natural Objects", Nov. 22, 2006, Linkoping University Electronic Press, SIGRAD 2006. The Annual SIGRAD Conference; Special Theme: Computer Games, Issue 19, Article 1, pp. 1-6.*

Erik Lindholm, Mark J Kilgard, Henry Moreton, "A User-Programmable Vertex Engine", 2001, ACM, Proceeding SIGGRAPH '01 Proceedings of the 28th annual conference on Computer graphics and interactive techniques, pp. 149-158.*

Ziyad S. Hakura, John M. Snyder, "Realistic Reflections and Refractions on Graphics Hardware With Hybrid Rendering and Layered Environment Maps", 2001, Springer, In: Gortler S.J., Myszkowski K. (eds) Rendering Techniques 2001, pp. 289-300.*

Manuel M. Oliveira, Maicon Brauwers, "Real-Time Refraction Through Deformable Objects", May 2, 2007, ACM, Proceedings of the 2007 symposium on Interactive 3D graphics and games, pp. 89-96.*

Chris Wyman, Greg Nichols, "Adaptive Caustic Maps Using Deferred Shading", Mar. 27, 2009, Blackwell Publishing, Computer Graphics Forum, vol. 28, Issue 2, pp. 309-319.*

Notice of Allowance dated Dec. 26, 2018, U.S. Appl. No. 15/325,700, filed Jan. 11, 2017.

Search Report dated Feb. 1, 2016, UK Patent Application No. GB1515723.3.

Engelhardt, "Epipolar Sampling for Shadows and Crepuscular Rays in Participating Media with Single Scattering," Proceedings of the 2010 Symposium on Interactive 3D Graphics and Games, Feb. 2010.

Kenny Mitchell, "Volumetric Light Scattering as a Post-Process," GPU Gems 3, Feb. 2008, NVIDIA Corporation, http://http.developer.nvidia.com/GPUGems3/gpugems3_ch13.html.

Skals, "Real-time Scattering," Feb. 28, 2012, www2.imm.dtu.dk/pubdb/views/ . . . /imm6267.pdf.

Toth, et al., "Real-time Volumetric Lighting in Participating Media," the Eurographics Association Mar. 2009, http://sirkan.iit.bme.hu/~szirmay/lightshaft_link.htm.

Mitchell, "Light Shafts: Rendering Shadows in Participating Media," ATI Research, Inc., Game Developers Conference, Mar. 2004.

Dobashi, et al., "Interactive Rendering Method for Displaying Shafts of Light," Oct. 2000, http://ime.ist.hokudai.ac.jp/~doba/papers/pg00.pdf.

Prast, et al., "Caustics, Light Shafts, God Rays," Institute of Computer Graphics and Algorithms, Vienna, University of Technology, Feb. 2013, https://old.cg.tuwien.ac.at/research/publications/2013/Prast_Stefanie_2013-CLG/Prast_Stefanie_2013-CLG-Thesis.pdf.

Keller, et al., "Interleaved Sampling," Proceedings of the 12th Eurographics Workshop on Rendering Techniques, London, UK, Jun. 2001, http://cs.ubc.ca/labs/imager/tr/2001/keller2001a/keller.2001a.pdf.

Shin, et al., "Rendering Particles in a Shaft of Light," Jul. 2011, http://www.csee.umbc.edu/~olano/class/635-11-2/shin7.pdf.

Nilsson, "Two Hybrid Methods of Volumetric Lighting," Lund University, Mar. 20, 2008, http://fileadmin.cs.lth.se/graphics/theses/projects/volumetric/thesis.pdf.

"White Paper: Volume Light," NVIDIA Corporation, Jan. 2008, http://developer.download.nvidia.com/SDK/10.5/direct3d/Source/VolumeLight/doc/VolumeLight.pdf.

Notice of Allowance dated Jan. 23, 2018, in U.S. Appl. No. 15/247,272.

Nishita, "A Shading Model for Atmospheric Scattering Considering Luminous Intensity Distribution of Light Sources", ACM, Computer GRaphics, vol. 21, No. 4, Jul. 1987, pp. 303-310.

(56) References Cited

OTHER PUBLICATIONS

Combined Search and Examination Report dated Feb. 25, 2016, UK Patent Application No. GB1518908.7.
International Search Report and Written Opinion dated Nov. 7, 2016, in International Patent Application No. PCT/GB2016/052432.
Laszlo Szirmay-Kalos et al., "Approximate Ray-Tracing on the GPU with Distance Impostors", Computer Graphics Forum, vol. 24, No. 3, Sep. 1, 2005, pp. 695-704.
Mendez, "Reflections Based on Local Cubemaps in Unity", ARM Mali Graphics 2014. Aug. 7, 2014, pp. 1-19.
Laszlo Szirmay-Kalos et al., "Specular Effects on the GPU: State of the Art", Computer Graphics Forum, vol. 28, No. 6, Sep. 1, 2009, pp. 1586-1617.
Lagarde et al., "Local Image-Based Lighting with Parallax-Corrected Cubemap", GamesConnection, Nov. 30, 2012.
Li, et al., "Real-Time Reflection Using Ray Tracing with Geometry Field", Eurographics 2006 Conference, Short Papers, Sep. 4, 2006, Vienna, Austria.
PCT International Search Report and Written Opinion dated Apr. 29, 2016, PCT Patent Application No. PCT/GB2016/050498.
GB Search Report dated Aug. 25, 2015, GB Patent Application No. GB1503386.3.
GB Search Report dated Aug. 25, 2015, GB Patent Application No. GB1503391.3.
Behc, "Box Projected Cubemap Environment Mapping," Graphics and GPU Programming, Apr. 20, 2010.
Bjorke, "Image-Based Lighting," GPU Gems, Chapter 19, NVIDIA Corporation, 2004.
"Environment Mapping Techniques," The Cg Tutorial, Chapter 7, NVIDIA Corporation, 2003.
Ihrke, et al., "Eikonal Rendering: Efficient Light Transport in Refractive Objects," SIGGRAPH 2007 Conference Aug. 2007.
Sebastien Lagarde, Version 1.28 Living blog on "Image-based Lighting approaches and parallax-corrected cubemap, SIGGRAPH 2012," seblarde.wordpress.com, Sep. 29, 2012.
Sousa, "Generic Refraction Simulation," GPU Gems, Chapter 19, NVIDIA Corporation, 2005.
Amendment dated Sep. 12, 2018, U.S. Appl. No. 15/325,700, filed Jan. 11, 2017.
PCT International Search Report and Written Opinion dated Jan. 25, 2016, in PCT Patent Application PCT/GB2015/052054.
Friedrich A. Lohmueller: "Textures with POV-Ray—Transparency mapping I", Jan. 20, 2013 (Jan. 20, 2013), XP055235051, Retrieved from the Internet: URL:https://web.archive.org/web/20130120200610/http://f-lohmueller.de/pov_tut/tex/tex_885e.htm, the whole document figures 1-3.
Friedrich A. Lohmueller: "Textures with POV-Ray—Transparency mapping II", Jan. 20, 2013 (Jan. 20, 2013), XP055235064, Retrieved from the Internet: URL:https://web.archive.org/web/20130120200631/http://f-lohmueller.de/pov_tut/tex/tex_886e.htm—the whole document.
Sebastien Lagarde, et al.: "Local Image-based Lighting with Parallax-corrected Cubemap", GamesConnection, Nov. 30, 2012 (Nov. 30, 2012), XP055235164, Retrieved from the Internet: URL:https://seblagarde.files.wordpress.com/2012/08/parallax_corrected_cubemap-gameconnection2012.pdf—the whole document p. 23.
Sebastien Lagarde, et al.: "Local image-based lighting with parallax-corrected cubemaps", SIGGRAPH '12 ACM SIGGRAPH 2012 Talks, ACM, 2 Penn Plaza, Suite 701 New York NY 10121-0701 USA, Aug. 5, 2012 (Aug. 5, 2012), p. 1, XP058008298, DOI: 10.1145/2343045.2343094 ISBN: 978-1-4503-1683-5 the whole document abstract.
GB Search Report dated Jan. 21, 2015, GB Patent Application No. GB1413145.2.
Bunnell, et al., Chapter 11. Shadow Map Antialiasing, Sep. 2007, Retrieved from the Internet: URL: http://http.developer.nvidia.com/GPUGems/gpugems_ch11.html.
Bjorke, Chapter 19. Image Based Lighting, Sep. 2007, Retrieved from the Internet: URL: http://http.developer.nvidia.com/GPUGems/gpugems_ch19.html.
Tutorial on Shadow Mapping, Paul's Projects, 2002/2003 Retrieved from the Internet: URL: http://www.paulsprojects.net/tutorials/smt/smt.html.
Everitt, "Projective Texture Mapping," NVIDIA, Dec. 2015, Retrieved from the Internet: URL: www.cse.unsw.edu.au/~cs9018/readings/projective_texture_mapping.pdf.
U.S. Appl. No. 15/770,322, filed Apr. 23, 2018.
Notice of Allowance dated Jun. 15, 2018, in U.S. Appl. No. 15/247,272, filed Aug. 25, 2016.
Office Action dated Jun. 27, 2018, in U.S. Appl. No. 15/325,700, filed Jan. 11, 2017.
Response to Office Action dated Sep. 30, 2019, U.S. Appl. No. 15/770,322, filed Apr. 23, 2018.
Office Action dated Jul. 15, 2019, U.S. Appl. No. 15/770,322, filed Apr. 23, 2018.
Wang, Youyou, et al., "A Compact Representation for 3D Animation Using Octrees and Affine Transformations", Hindwai Publishing Corp, International Journal of Digital Multimedia Broadcasting, vol. 2010, Article ID 924091 (Year: 2010).

\* cited by examiner

US 10,614,619 B2

GRAPHICS PROCESSING SYSTEMS

BACKGROUND

The technology described herein relates to graphics processing systems, and in particular to methods of and apparatus for taking into account the effects of refraction when rendering images for display.

When rendering images, such as output frames, for display in graphics processing systems, it is often desirable to be able to take account of the effects of refraction in the scene being rendered. These effects may be present whenever a transparent or semi-transparent object appears in the scene. Various rendering techniques try to do this.

One such technique is so-called "ray tracing". In this technique the path of a light ray is traced through each pixel in the image plane and the effects of its encounters with objects in the scene is simulated.

While ray tracing can be an effective technique for allowing the effects of refraction to be taken into account when rendering images, it is in general very computationally expensive. Ray tracing is not therefore typically appropriate for rendering images in situations where the processing power of the graphics processing system is limited. This could, e.g., particularly be the case where it is desired to render an image using, e.g., a mobile device that may accordingly have limited processing capacity.

Another technique for taking into account the effects of refraction makes use of so-called "perturbed textures". In this technique, the parts of the scene that are behind the transparent or semi-transparent object (e.g. relative to the viewpoint (camera) position) are firstly rendered to texture. The texture is then subjected to some form of perturbation, e.g. such that when the texture is subsequently applied to the object a "refractive look" is achieved for the object.

Because this technique is based on a perturbation of a texture, it does not properly take into account the real-world physical effects of refraction, and so the resulting image can often be unrealistic. Additionally, this technique cannot take into account areas of the scene that are outside the field of view of the camera but that would otherwise be visible due the effects of refraction. Distortions and instabilities such as pixel shimmering are also typically present. This can be particularly noticeable where the effects of refraction are important in a scene, e.g. when displaying a close-up of a complex transparent or semi-transparent object, and/or when the camera is moving.

Furthermore, using this technique it is necessary to regenerate the texture whenever the viewpoint (camera) position changes (which can happen each frame). This can be relatively expensive, e.g. in terms of processing, memory and bandwidth resources for preparing, storing and using the texture.

The Applicants believe therefore that there remains scope for improved techniques for rendering refractions in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
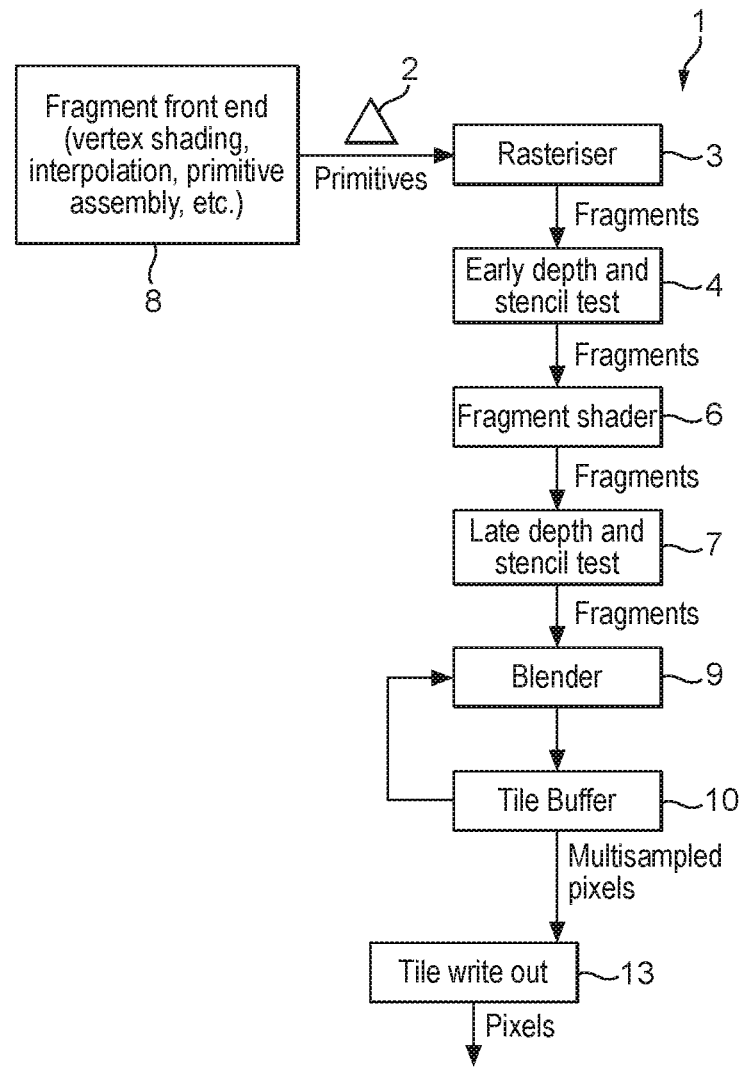
FIG. 1 shows schematically a graphics processing pipeline that can be operated in the manner of the technology described herein.

A first embodiment of the technology described herein comprises a method of operating a graphics processing system when rendering a scene for output, in which a bounding volume representative of the volume of all or part of the scene to be rendered is defined; the method comprising:

when rendering an at least partially transparent object that is within the bounding volume in the scene:

performing a rendering pass for some or all of the object in which the object is rendered as if it were an opaque object; and in the rendering pass:

for at least one sampling position on a surface of the object, determining the colour to be used to represent the part of the scene that will be visible through the object at the sampling position by:

using a view vector from a viewpoint position for the scene to determine a refracted view vector for the sampling position;

determining the position on the bounding volume intersected by the refracted view vector;

using the intersection position to determine a vector to be used to sample a graphics texture that represents the colour of the surface of the bounding volume in the scene; and using the determined vector to sample the graphics texture to determine a colour for the sampling position to be used to represent the part of the scene that will be visible through the object at the sampling position.

A second embodiment of the technology described herein comprises a graphics processing pipeline comprising:

a plurality of processing stages, including at least a rasteriser that rasterises input primitives to generate graphics fragments to be processed, each graphics fragment having one or more sampling positions associated with it, and a renderer that processes fragments generated by the rasteriser to generate output fragment data;

wherein the graphics processing pipeline is configured, when rendering a scene for output in which a bounding volume representative of the volume of all or part of the scene to be rendered is defined, to:

when rendering an at least partially transparent object that is within the bounding volume in the scene:

perform a rendering pass for some or all of the object in which the object is rendered as if it were an opaque object; and in the rendering pass:

for at least one sampling position on a surface of the object, determine the colour to be used to represent the part of the scene that will be visible through the object at the sampling position by:

using a view vector from a viewpoint position for the scene to determine a refracted view vector for the sampling position;

determining the position on the bounding volume intersected by the refracted view vector;

using the intersection position to determine a vector to be used to sample a graphics texture that represents the colour of the surface of the bounding volume in the scene; and using the determined vector to sample the graphics texture to determine a colour for the sampling position to be used to represent the part of the scene that will be visible through the object at the sampling position.

The technology described herein is directed to a method of and apparatus for taking account of the effects of refraction when rendering a scene for output, in particular in the situation where there is at least one at least partially transparent (i.e. not fully opaque) object present within a scene being rendered. In the technology described herein, to take into account the effects of refraction through the at least partially transparent object, some or all of the at least partially transparent object is treated as if it were opaque, and the appropriate colours for sampling positions on the surface of the object are determined using a texture representative of the colour of the surface of a bounding volume that surrounds the object (and so that represents what will be visible through the object), with the texture being sampled using a vector derived from a "refracted" view vector.

As will be discussed further below, the Applicants have recognised that this arrangement can be used to simulate real-world physical effects of refraction in a particularly efficient manner. This then means that real-world physical effects of refraction can be simulated during real-time rendering (i.e. at "run-time") and/or when rendering in situations where the processing power of the graphics processing system is limited. This is in contrast with the "ray-tracing" techniques which are in general too computationally expensive for mobile real-time rendering, and with the "perturbed texture" approach which can be relatively expensive and which does not properly take into account the real-world physical effects of refraction.

The arrangement of the technology described herein can be used to simulate the effects of refraction using a single "static" graphics texture that represents the colour of the surface of the bounding volume. This then means that, for example, the same graphics texture can be used for multiple frames, even if the viewpoint (camera) position changes. This is in contrast to, for example, conventional real-time rendering arrangements, in which the perturbed texture has to be continuously regenerated, e.g. for each frame.

Because the technology described herein can use a "static" texture to simulate the refraction effect, rather than using "dynamic" textures as in conventional arrangements, that also means that the texture of the technology described herein can be generated in much higher quality, and using more sophisticated effects. The texture can, for example, be generated "offline" and subjected to non-real-time optimisations, and then provided for use by the graphics processing system. This is in contrast to conventional arrangements, for example, where because the perturbed texture must be regenerated, e.g. for each frame, it must be generated in low resolution/low quality form in order to maintain the speed necessary for real-time rendering. The technology described herein does not suffer from this disadvantage, and so the texture that is used to simulate refraction effects may be generated to have a much higher quality, thereby providing higher quality refraction effects. Because a single, "static" texture can be used in the technology described herein for a given bounding volume, it is also possible to provide the texture in a compressed form, if desired, thereby providing bandwidth and memory savings.

In the technology described herein, the at least partially transparent object at the sampling position to which the colour from the texture is applied is treated (rendered) as if it were opaque (and not as being fully or partially transparent which it actually is). The Applicants have recognised in this regard that notwithstanding the fact that the object itself is fully or partially transparent, a better representation of refraction can be achieved by treating the object at the sampling position as if it were opaque and then applying a texture to it in the manner of the technology described herein. This then ensures that the colour for the sampling position (i.e. representing the part of the refracted scene that will be visible through the object at the sampling position) will be determined from the graphics texture (using a vector derived from the refracted view vector) and will not, e.g., be subject to any blending with colour values from objects that may be behind the object but not actually visible at the sampling position in question due to the effects of refraction. Furthermore, treating the object at the sampling position as opaque facilitates the use of a texture in the manner of the technology described herein for rendering fully or partially transparent objects, and thus the advantages (as discussed herein) that brings.

The technology described herein can accordingly improve the rendering quality (and facilitate simulation of the real-world physical effects of refraction) while reducing the processing, memory, bandwidth and power requirements of the graphics processing system, and can facilitate simulation of real-world physical effects of refraction through a fully or partially transparent object in a scene during real-time rendering (i.e. at "run-time") and/or when rendering in situations where the processing power of the graphics processing system is more limited.

The bounding volume of the technology described herein may be any suitable bounding volume that represents the volume of all or part of the scene to be rendered. The bounding volume could represent the entire scene that is being rendered (and in one embodiment this is the case), but it would also be possible for the bounding volume to represent only a part of the scene. The bounding volume may, for example, represent a room.

The bounding volume can be defined in any desired and suitable manner. It is in an embodiment defined in world space. It can take any suitable and desired form, but is in an embodiment in the form of a bounding box (a cube). Other arrangements for the bounding volume would, of course, be possible.

The graphics texture that represents the colour of the surface of the bounding volume can take any suitable and desired form. In an embodiment it is in the form of a texture that is used for environment mapping, such as a cube texture (cube map) or a sphere texture (sphere map).

Thus, in an embodiment, the texture that represents the colour of the surface of the bounding volume comprises a texture that indicates and stores for points on a surface that surrounds a reference position within the volume that the texture encompasses, one or more colour values for each point, with the texture then being sampled based on a vector (direction) from the reference position for the texture (that the texture is defined with respect to).

In other words, the texture in an embodiment stores one or more colour values for respective directions from a reference position (point) within the volume that the texture represents, and is sampled by determining a direction from the reference position (point) within the texture to a position on the surface that the texture represents.

The reference position (point) within the texture that the texture is defined (and sampled) with respect to may be selected as desired. In one embodiment, the reference position (point) within the texture that the texture is defined (and sampled) with respect to is at the centre of the volume that the texture encompasses. This then means that the texture will effectively represent the colour of the surface of the bounding volume "as seen" from the centre of the volume, and so will comprise a relatively "uniform" representation (e.g. such that all parts of the surface of the bounding volume will be represented by the texture with a similar level of detail).

However, this need not be the case, and in an embodiment, the texture (and in an embodiment its reference position (point)) is defined with respect to the at least partially transparent object that is within the bounding volume that the texture is to be used with. In an embodiment the reference position (point) for the texture is located within the object, for example (and in an embodiment) close to or at the centre of the object. Thus, in an embodiment, the reference position (point) that the texture is defined (and sampled) with respect to is within, and in an embodiment at or near the centre of, the at least partially transparent object. (Accordingly, the reference position may take any position within the volume that the texture encompasses, i.e. depending on the position of the object within the volume.) Thus, in an embodiment, the texture is defined for and with respect to the particular at least partially transparent object that the texture is to be used with.

The Applicants have recognised that defining the texture in this manner is particularly convenient and useful in the context of the technology described herein. This is because in this way the texture will effectively represent the colour of the surface of the bounding volume "as seen" from the object (rather than, e.g., as seen from the centre of the volume that the texture encompasses). Accordingly, the texture may comprise a relatively "non-uniform" representation of the colour of the surface of the bounding volume (e.g. such that those parts of the surface of the bounding volume to which the reference position is relatively closer will be represented by the texture with relatively more detail). When such a "non-uniform" texture is sampled to determine the colour to be used to represent the part of the (refracted) scene that will be visible through the object at the sampling position, the parts of the surface of the bounding volume that are relatively closer to the object will be able to be sampled in relatively more detail (whereas the parts of the surface of the bounding volume that are relatively further away from the object will be sampled in relatively less detail). As will be appreciated by those skilled in the art, this can improve the depiction of the effects of refraction.

Other arrangements would, of course, be possible, if desired.

The texture representing the colour of the surface of the bounding volume is in an embodiment configured to correspond to the bounding volume for the scene. Thus, for example, where the bounding volume is in the form of a cube, the texture is in an embodiment in the form of a cube texture (a cube map). In an embodiment, the texture is a cube texture (a cube map).

Correspondingly, the texture in an embodiment has a resolution that will be suitable for the anticipated size of the bounding volume that it is to be used with (although this is not essential, and the texture could, e.g., be scaled for use, if required).

The texture should, and in an embodiment does, store one or more colour values (e.g. three RGB colour values) indicative of the colour of the surface of the bounding volume in the scene in the relevant direction from the reference point within the volume that the texture is defined in relation to.

The texture could store the colour values alone (e.g. store one or more RGB colour channels only) (and may in an embodiment be an RGB texture). In an embodiment, the texture could also store one or more other data channels, such as an alpha channel (e.g. the texture may be an RGBα texture (and in an embodiment, this is done)). In this case, the other data channel(s) (the alpha channel) could be used for different purposes. For example, an RGBα texture could be used to store a texture to be used in the manner of the technology described herein in the RGB colour channels, and also to store a second texture for other purposes in the alpha channel. This would then allow the same, e.g. cube, texture to be used for different purposes.

In an embodiment where the texture that represents the colour of the surface of the bounding volume also includes other data channel(s) e.g. an alpha channel, the other data channel(s) (e.g. alpha channel) is used to represent one or more additional properties of the surface of the bounding volume, such as for example, the transparency of the surface of the bounding volume (i.e. the texture may comprise a transparency (alpha) channel).

In an embodiment where the texture also includes a transparency channel, the transparency channel is also used in the method of the technology described herein, for example as a further, transparency, parameter to be used when calculating the effect of refraction.

Additionally or alternatively, the texture that represents the colour of the surface of the bounding volume may comprise (encode) other information or properties that relates to the scene being rendered, e.g. that need not be tied to the surface of the bounding volume. The additional information could comprise, for example, information relevant to the refraction rendering process, such as relating to the manner in which the refraction effect should be applied, e.g., at the surface or within the volume of the object. Such information could include, for example, information relating to the bounding volume, such as indicating one or more areas of the bounding volume through which a far environment, such as sky, can be seen. Additionally or alternatively, the additional information could comprise information relating to a property or properties of the at least partially transparent object, which are in an embodiment relevant to the refraction rendering process, such as indicating (encoding) a region or regions of the at least partially transparent object for which refraction does not take place, such as one or more regions where one or more holes are present and/or where the object is fully opaque.

This additional information is in an embodiment then used as a (further) parameter for controlling or modifying the rendering operation. For example, where the additional information indicates (encodes) a region or regions of the at least partially transparent object for which refraction does not take place, such as one or more regions where one or more holes are present and/or where the object is fully opaque, then the information could be used to determine whether or not to apply the refraction effect. Where the additional information indicates one or more areas of the bounding volume through which a far environment, such as sky, can be seen, then the information could be used to apply, e.g., a "skybox" texture in a convenient manner. Other arrangements would, of course, be possible.

Thus, in an embodiment, the texture that represents the colour of the bounding volume is used to indicate (store)

other information and/or properties that relates to the scene being rendered, such as a property or properties of the object itself.

This additional information can be stored (included) in the texture as desired. In an embodiment it is stored in another, e.g. additional, data channel of the texture (e.g. that is not being used to store the colour values), such as, and in an embodiment, in the case of an RGBα texture, the alpha channel.

Other arrangements would, of course, be possible.

As discussed above, the technology described herein is concerned with the situation where it is desired to simulate the effects of refraction though an at least partially transparent object that is present in a scene being rendered.

The at least partially transparent object that is considered in the technology described herein should be (and in an embodiment is) a transparent or semi-transparent (i.e. not fully opaque) object, i.e. such that the effects of refraction are relevant. All of the object may be at least partially transparent, or only a part (some but not all) of the object may be at least partially transparent.

As will be discussed in more detail below, the entire (all of) the at least partially transparent object may be rendered in the rendering pass, or only a part (some but not all) of the at least partially transparent object may be rendered in the rendering pass. In an embodiment at least the at least partially transparent parts of the object are rendered in the rendering pass.

In the technology described herein, the (part of the) object that is rendered in the rendering pass is rendered as if it were an opaque object (notwithstanding the fact that some or all of the (part of the) object that is being rendered is actually fully or partially transparent), i.e. alpha blending is disabled for the (part of the) object that is rendered in the rendering pass. The effect of this then is that the (part of the) object in question is rendered as an opaque object, but with the appropriate colour values from the texture that represents the surface of the bounding volume being used for any at least partially transparent sampling positions on the surface of the object.

The resulting (output) colour value for the sampling position from the rendering pass is correspondingly in an embodiment also set to be opaque, i.e. to have its alpha value equal to 1 (α=1).

In the technology described herein, the colour to be used to represent the part of the (refracted) scene that will be visible through the object at a sampling position on a surface of the object is determined. The sampling position in question should be (and in an embodiment is) a sampling position on a surface of a part of the object that is fully or partially transparent, i.e. such that refraction is relevant (but as discussed above will in fact be treated as being opaque in the rendering pass).

In the technology described herein, in order to determine a colour to be used for the sampling position in question, a view vector from the viewpoint (camera) position is used to determine a refracted view vector for the sampling position (for which the colour is required) (i.e. the path of the view vector from the viewpoint (camera) position to the surface of the bounding volume taking account of the effects of refraction as the view vector passes through the surface of the at least partially transparent object at the sampling position in question).

This can be determined in any suitable and desired manner.

In one embodiment, the view vector from the viewpoint (camera) position to the sampling position (in world space) is determined, and then the refracted view vector is determined from the sampling position view vector. In one embodiment, the vectors from the viewpoint (camera) position to the vertices of the primitive that the sampling point being considered relates to are determined, and then the vector from the viewpoint (camera) position to the sampling point is determined by appropriate (e.g. hardware) interpolation of those viewpoint to vertex vectors. The viewpoint to vertex vectors are in an embodiment calculated in the world space. In an embodiment, for each vertex, the vector from the viewpoint to the vertex is determined. The vector from the viewpoint position to the sampling point is in an embodiment then determined by appropriate interpolation of the viewpoint to vertex vectors, and then is in an embodiment used to determine the refracted view vector.

In another embodiment, the vectors from the viewpoint (camera) position to the vertices of the primitive that the sampling point being considered relates to are determined (in world space), and then these vectors are each used to calculate a refracted view vector for each vertex. In an embodiment, for each vertex, the vector from the viewpoint to the vertex is determined and the corresponding refracted view vector is calculated. The refracted view vector for the sampling point is in an embodiment then determined by appropriate (e.g. hardware) interpolation of the vertex refracted view vectors.

Other arrangements would, of course, be possible.

The viewpoint to sampling point vector (whether generated by interpolation from viewpoint to vertex vectors or otherwise) or the viewpoint to vertex vector(s) can be used to determine the corresponding refracted view vector(s) in any manner as desired.

The determination of the refracted view vector(s) from the view vector(s) is in an embodiment carried out by considering the effects of refraction on (each of) the view vector(s), e.g. as it passes through a surface of the object in question. Thus, in an embodiment, using the view vector to determine the refracted view vector comprises determining the change in direction of the view vector due to refraction of the view vector at the surface of the object.

The effect of refraction is to (potentially) alter the direction of a light ray as it passes from a first medium having a first refractive index (e.g., $n_1$) to a second medium having a second, different refractive index (e.g., $n_2$) (i.e. where $n_1 \neq n_2$).

The degree by which the direction is altered is given by Snell's law:

$$\frac{\sin \theta_1}{\sin \theta_2} = \frac{n_2}{n_1}$$

where $\theta_1$ is the angle of incidence of the incoming light ray measured from the normal of the boundary between the two media, and $\theta_2$ is the angle of refraction of the refracted ray measured from the normal of the boundary.

In embodiments of the technology described herein, the refracted view vector is determined from the view vector, e.g. as it passes through a surface of the object. Thus, the environment surrounding the at least partially transparent object within the scene in an embodiment corresponds to the "first medium", and the first refractive index $n_1$ in an embodiment corresponds to the refractive index of the environment surrounding the at least partially transparent object. The surrounding medium may be considered as being, e.g., air, and so the first refractive index will typically be (and in one embodiment is) equal to 1 (i.e. $n_1=1$). The environment surrounding the at least partially transparent object (the "first medium") may, of course, comprise other materials having the same or different refractive indices, such as water, etc.

Correspondingly, in the arrangement of an embodiment, the at least partially transparent object corresponds to the "second medium", and the so second refractive index $n_2$ in an embodiment corresponds to the refractive index of the at least partially transparent object.

The at least partially transparent object may have a single, uniform refractive index, or it may have a non-uniform refractive index that, e.g., changes as a function of position within the object.

The refractive indices for the surrounding medium and the object can be provided and defined in any suitable and desired manner, for example as one or more single values (e.g. where the object and/or medium have uniform refractive indices). A non-uniform (e.g. varying in three-dimensions) refractive index could be indicated (stored), for example, using a graphics texture.

In an embodiment, in order to determine the refracted view vector from the view vector, the normal of the surface of the object at the sampling position or vertex is determined and used. Thus, in an embodiment, the process comprises using the normal vector of the surface of the object at the sampling point or vertex to determine the refracted view vector. This may be done in any manner as desired, but as will be discussed further below, in an embodiment, this is done by determining and using the normal of the primitive on the surface of the object that the sampling position lies on or that the vertex relates to.

The refracted view vector is in an embodiment then determined. This may be done in any appropriate and desired manner, e.g. based on Snell's law (as described above) using the dot product of the normalised view vector (incident vector) and the normal vector, Pythagoras's theorem, and the ratio between the refractive indices.

In an embodiment, a predefined "refract" function is used to determine the refracted view vector R:

$$R=\text{refract}(I,N,eta)$$

where I is the normalized view or incident vector, N is the normalized normal vector, eta is the ratio of indices of refractions, i.e. $eta=n_1/n_2$.

Other arrangements would, of course, be possible.

For example, it would be possible to determine the refracted view vector by firstly determining the angle of incidence $\theta_1$ of the view vector, e.g. by determining the angle between the normal vector and the view vector from the viewpoint (camera) position to the sampling point or vertex being considered, and in an embodiment then determining the angle of refraction $\theta_2$, e.g. using Snell's law (as described above). The angle of incidence $\theta_1$, the refractive index of the first medium $n_1$ (e.g. the refractive index of the medium surrounding the object), and the refractive index of the object $n_2$ may be used in Snell's law to determine the angle of refraction.

The refracted view vector may then be determined using the angle of refraction $\theta_2$, e.g. by effectively rotating the view vector as it passes through the surface of the object.

Thus, the refracted view is in an embodiment a vector that extends from the sampling position or vertex in question, in an embodiment substantially in the same general direction as the view vector, but at an angle equal to the angle of refraction $\theta_2$ measured from the normal of the surface of the object at the sampling position or vertex, and in an embodiment in the plane defined by the normal vector and the view vector.

In various embodiments, relatively more complex effects of refraction can be taken account of, in an embodiment when determining the refracted view vector.

Thus, for example, where the at least partially transparent object has a non-uniform refractive index, the determination of the refracted view vector from the view vector may comprise more complex calculations, that e.g. consider the path of the view vector as it passes through the regions of different refractive indices, if desired.

Additionally or alternatively, the effects of a changing or moving medium (such as, e.g., flowing water) within the at least partially transparent object may be (approximately) taken into account by animating the refracted view vector. The properties of the animation may be selected as desired to, e.g., represent the changes in the medium with time. For example, a sinusoidal variation or some other function could be applied to the refracted view vector to animate it. This represents a particularly simple and efficient technique for rendering such media, e.g. in which it is not necessary to directly determine the effects of the changes in the medium on the refracted view vector. Thus, in an embodiment, the process comprises animating the refracted view vector (i.e. varying (perturbing) it (e.g., and in an embodiment, in terms of its magnitude and/or direction) over time).

Additionally or alternatively, the effects of chromatic aberration can be taken into account by, e.g., determining plural (slightly) different refracted view vectors (e.g. one per (RGB) colour channel of the texture), and using each of the refracted view vectors to sample the texture for each of the colour channels (in an embodiment in the manner of the technology described herein).

The determined refracted view vector(s) for the sampling position may be output and used "as is" in the further stages of the graphics processing pipeline, but may be (and in one embodiment is or are) firstly normalised before this is done (i.e. if necessary). Accordingly, in an embodiment the refracted view vector is a unit vector that extends from the sampling position in question in a direction defined by the angle of refraction $\theta_2$ in the plane defined by the normal vector and the view vector.

These processes can be carried out by any desired and suitable stage or component of the graphics processing pipeline. In an embodiment, these processes are performed by a vertex shading stage of the graphics processing pipeline, in an embodiment by that stage executing an appropriate vertex shading program (vertex shader) to determine the refracted view vector, and then outputting the refracted view vector for use by other stages of the graphics processing pipeline. It would also be possible for a fragment shading stage of the graphics processing pipeline to perform some or all of these processes.

The position on the bounding volume intersected by the refracted view vector can be determined as desired. In an embodiment, the refracted view vector for the sampling position (in world space) is determined in an embodiment as described above, and the intersection point on the bounding volume of that vector from the sampling position is then determined.

The refracted view vector can be used to determine the position on the bounding volume intersected by that vector by any desired and suitable stage or component of the graphics processing pipeline. In an embodiment, this is done by a fragment shading stage (by a fragment shader) of the graphics processing pipeline, in an embodiment by that stage executing an appropriate fragment shading program (fragment shader) to calculate the intersection point. The fragment shader will use refracted view vector and information about the bounding volume as inputs to this process.

In an embodiment, the position on the bounding volume intersected by the refracted view vector is determined by a fragment shading stage of the graphics processing pipeline, in an embodiment by that stage executing an appropriate fragment shading program (fragment shader) that can calculate the intersection point. Other arrangements, such as this determination being done by a vertex shading stage of the graphics processing pipeline would also be possible, if desired.

The determined intersection position on the bounding volume can be used to determine the vector to be used to sample the colour representing graphics texture in any suitable and desired manner. For example, the vector from the sampling position to the intersection point could simply be used as the vector that is used to sample the graphics texture.

However, the Applicants have recognised that where the graphics texture is defined with reference to a reference position (e.g. the centre point) within the volume that the graphics texture corresponds to, then simply using the vector from the sampling position of interest to the intersection point on the bounding volume may not always sample the graphics texture correctly. Thus, in an embodiment, the sampling process involves accounting for (compensating for) the fact that the texture is defined with reference to a reference point that may not correspond to the sampling position being considered.

This compensation can be performed as desired but in an embodiment, the vector from the reference position that the texture is defined with respect to, to the determined intersection point on the bounding volume is determined, and then that vector is used to sample the colour-indicating texture. This will ensure that the correct position in the texture is sampled, even if the sampling position does not correspond to the reference position that the texture is defined with respect to. It, in effect, applies a "local" correction to the refracted view vector.

In other words, the determined intersection position on the bounding volume is used to determine a vector from the texture reference position (e.g. centre point) to the determined intersection point, and then that vector from the reference position to the determined intersection point is used to sample the colour-indicating texture.

The colour-indicating texture should then be sampled appropriately, using the determined "sampling" vector, to retrieve the desired colour. At least the (RGB) colour channel(s) of the colour-indicating texture should be sampled using the determined sampling vector to retrieve the colour.

Where the texture also includes one or more additional data channels (e.g. an alpha channel) (as discussed above), then one or more of additional channel(s) (e.g. the alpha channel) may also be sampled. The additional data channel(s) (e.g. the alpha channel) should be (and in an embodiment is) sampled using the determined sampling vector, e.g. when sampling the colour.

The colour-indicating texture can be sampled in any desired and suitable manner. For example, appropriate filtering (interpolation) processes, such as bilinear filtering, can be used when sampling the texture, if desired. Similarly, in the case where the colour-indicating texture is provided as a set of mipmaps, the sampling process is in an embodiment configured to filter (interpolate) the mipmaps to provide the sampled texture value, for example (and in an embodiment) using tri-linear filtering.

Where the texture is in the form of a set of mipmaps, the sampling process in an embodiment also comprises determining the mipmap level or levels (the level of detail) at which the colour-indicating texture should be sampled (and then sampling the so-determined mipmap level(s) for the colour-indicating texture).

The mipmap level (level of detail) to use is in an embodiment determined based on the distance from (the length of the vector from) the sampling point being considered to the intersection position on the bounding volume of the refracted view vector.

Other arrangements would, of course, be possible.

These processes can again be carried out by any desired and suitable stage or component of the graphics processing pipeline. In an embodiment they are performed by a fragment shading stage (a fragment shader) of the graphics processing pipeline, in an embodiment by executing an appropriate fragment shading program. They may also or instead be performed at least in part by an appropriate texture mapping stage of the graphics processing pipeline, if desired.

Once the texture has been sampled, the sampled colour for the surface of the bounding volume can then be used as desired, e.g. in an, e.g. conventional, calculation that determines the colour of the sampling point being considered.

The sampled colour for the sampling point can be used as desired to simulate the effect of refraction at the sampling point. The determined colour is in an embodiment used when determining the output, rendered, colour to be used for the sampling position. Thus, the sampled colour from the texture is in an embodiment used for the sampling position in question.

Thus, in an embodiment, the method of the technology described herein further comprises using (and the graphics processing pipeline of the technology described herein is further configured to use) the determined colour for the sampling position when rendering an output version of the sampling position. In a particular embodiment, the determined colour is used to represent the part of the (refracted) scene that will be visible through the object at the sampling position.

The determined colour may be used "as is", i.e. as the final colour that is determined and output for the sampling position in question by the rendering process (e.g. as the final colour that is displayed for the sampling position in question). Alternatively, the determined colour may be combined (e.g. blended) with one or more other colours determined for the sampling position in question and/or modified, e.g. by one or more other stages in the rendering process.

Thus, for example, in one particular embodiment, the determined colour (i.e. that represents the part of the (refracted) scene that will be visible through the object at the sampling position) is combined (blended) with the colour of the at least partially transparent object at the sampling position in question. Additionally or alternatively, one or more further graphical effects may be applied to the sampling position in question, e.g., to modify the colour of the sampling position, such as lighting effects, reflections, etc.

In an embodiment, the alpha value for the final, output version of the sampling position is set to opaque ($\alpha=1$), notwithstanding that the object itself is fully or partially transparent. This helps to ensure that the object is handled appropriately, e.g. in relation to other objects and primitives that may be rendered later.

Similarly, where one or more additional channels (the alpha channel) of the texture are also sampled, the sampled information for the sampling point can be used as desired to simulate the effect of refraction at the sampling point.

These processes can again be carried out by any desired and suitable stage or component of the graphics processing pipeline. In an embodiment they are performed by the renderer of the graphics processing pipeline, and in an embodiment by a fragment shading stage of the graphics processing pipeline (again in an embodiment by executing an appropriate fragment shading program that performs the desired rendering calculations).

Any or all of the above processes could be performed for sampling points individually, or some or all of them could be performed for sets of plural sampling points (which would then have the effect of performing the process for the sampling points within the set that is being considered). For example, where the graphics processing pipeline operates on fragments that each represent a set of plural sampling positions, the process of the technology described herein could be performed on a per-fragment basis, rather than individually for each sampling point that a fragment represents (and in an embodiment this is what is done). In this case, there would accordingly be, e.g., a single colour determined for a fragment, which would then be used for each sampling point that the fragment is being used to render.

It will be appreciated that although the technology described herein has been described above with particular reference to determining a colour at a given sampling point on the surface of the object in question, the technique of the technology described herein can be, and in an embodiment is, used for plural sampling points on the surface of the object, and in an embodiment for each sampling point on the surface of the object for which refraction needs to be considered when rendering the scene. Thus, the process is in an embodiment repeated for each of plural sampling points on the surface of the object that is being considered.

The surface of the object will typically be (and in an embodiment is) represented in the rendering process by one of more (and in an embodiment plural) primitives. Thus, in an embodiment, the process comprises (and the pipeline is configured to): rendering the at least partially transparent object by rendering one or more at least partially transparent primitives that represent the surface of the object by: performing a rendering pass for a primitive in which the primitive is rendered as if it were an opaque primitive; and in the rendering pass: for at least one sampling position on the primitive, determining the colour to be used to represent the part of the (refracted) scene that will be visible through the primitive at the sampling position in the manner of the technology described herein. The process is in an embodiment repeated for each sampling position on the primitive, and in an embodiment for each of plural at least partially transparent primitives that make up the surface being considered.

In one embodiment, a single rendering pass (i.e. the rendering pass of the technology described herein) is used to determine the effects of refraction through the surface of the object in question.

Although a single rendering pass may be used for any at least partially transparent object, as desired, the Applicants have found that this is particularly appropriate and useful where, for example, the at least partially transparent object comprises a "solid", non-hollow object (e.g., such that the view vector will only interact with the object once as it passes through and is refracted by the object). Thus, in an embodiment, where the object comprises a "solid" object, then the process for determining the effects of refraction in an embodiment comprises a single-pass process. This single rendering pass in an embodiment renders both the front and back surfaces of the object.

In such embodiments, all of the at least partially transparent regions of the at least partially transparent object are in an embodiment treated as being opaque in the rendering pass (and in an embodiment, the colours for all of the at least partially transparent sampling positions for the object are determined by sampling the colour-indicating texture in the manner of the technology described herein).

In another embodiment, one or more additional rendering passes may be used to render the object in question. In one such embodiment, when rendering the at least partially transparent object, in an embodiment some (but not all) of the object is rendered in a first rendering pass (which in an embodiment corresponds to the rendering pass of the technology described herein discussed above), and then some or all of the remaining portion of the object is rendered in a second rendering pass.

Again, although two or more rendering passes may be used for any at least partially transparent object (such as a "solid" object), as desired, the Applicants have found that this is particularly appropriate and useful where, for example, the at least partially transparent object is other than (not) a "solid" object, e.g. is an object made up of multiple (e.g. two or more) portions separated by a medium having a different refractive index (e.g., such that the view vector will interact with the object more than once as it passes through and is refracted by the object), for example a hollow object, a concave object such as a glass, etc. Thus, in an embodiment, where the object comprises other than (not) a "solid" object, then the process in an embodiment comprises one or more additional rendering passes (that is, two or more rendering passes in total).

In one such embodiment, the back surface (or "back faces") of the object, i.e. the surface of the object that is furthermost from the viewpoint (camera) position for the scene, is rendered in the first rendering pass, and then other portions of the object (e.g. the portions of the object that are relatively closer to the viewpoint (camera) position for the scene such as the front surface (or "front faces") of the object) are rendered in the second rendering pass.

The back surface of the object is in an embodiment treated as being opaque in the first rendering pass. Thus, the process in an embodiment comprises performing a first rendering pass for the back surface of the object in which the back surface is rendered as if it were opaque; and in the first rendering pass: for at least one sampling position, determining the colour to be used to represent the part of the (refracted) scene that will be visible through the object at the sampling position in the manner of the technology described herein discussed above. In the first rendering pass the portions of the object other than the back surface (i.e. the front surface) are in an embodiment not rendered, i.e. are in an embodiment "culled" from rendering. Thus in the first rendering pass for the object, front face culling is in an embodiment enabled.

In the second rendering pass, the portions of the object other than the back surface (i.e. the front surface) of the object are in an embodiment then rendered, in an embodiment without rendering the back surface, i.e. the back surface of the object is in an embodiment "culled" from rendering. Thus in the second rendering pass for the object, back face culling is in an embodiment enabled.

The second rendering pass in an embodiment uses the results of the first rendering pass when determining the colour values for the sampling positions on the (front) surface of the object.

In an embodiment the results of the first rendering pass are mixed (alpha blended) with the results of the second rendering pass. The manner in which this is done can be selected as desired. For example, the type of blending operation and the blend factor (e.g. the relative proportions by which the results are combined) can be selected as desired.

Thus, in an embodiment, in the second rendering pass, the front surface of the object is in an embodiment rendered, e.g. in a conventional manner, i.e. in an embodiment by treating the front surface as being partially transparent or transparent (as it is).

The transparency (alpha value) of the final colour for sampling position(s) output from the second rendering pass can be selected as desired. A constant transparency (alpha value) may be defined and used for the entire object, or a transparency (alpha value) that varies across the object may be defined and used. A non-constant transparency (alpha value) could be stored, for example, in a graphics texture.

In one embodiment, the effects of refraction due to the change in refractive index at the front surface of the object may be taken into account, e.g. in the second rendering pass. For example, the techniques of the technology described herein may be applied to front surface in the second rendering pass. However, the Applicants have found that an adequate depiction of refraction can typically be achieved without explicitly taking this into account, and furthermore that this can reduce the amount of processing, memory and bandwidth resources that would otherwise be required. Thus, in an embodiment the effects of refraction due to the change in refractive index at the front surface of the object are not taken into account, e.g. in the second rendering pass.

It will be appreciated that in these embodiments, some (but not all) of the at least transparent object is in an embodiment treated as being opaque (and that the colours for the sampling positions for the parts of the object that are treated as being opaque are in an embodiment determined by sampling the colour-indicating texture in the manner of the technology described herein).

Other processes would, of course, be possible.

Regardless of the number of rendering passes used to determine the effects of refraction, one or more additional rendering passes may be used, e.g., for other purposes, if desired.

The process of the technology described herein is in an embodiment repeated for plural scenes in a sequence of scenes being rendered, e.g., and in an embodiment, for each frame of a sequence of frames to be rendered, that includes one or more at least partially transparent objects for which refraction may be relevant. It may also be performed appropriately for each at least partially transparent object that is present in a scene, as and if desired.

The technology described herein also extends to the generation of textures representing the colour of the surface of bounding volumes for a scene and to the textures themselves. It may be, for example, that the textures would be generated (and stored) separately, and/or in advance, and then, e.g., provided to a graphics processor for use. The technology described herein extends to these activities, as well as to the use of the colour-indicating textures for rendering refraction within a bounding volume for a scene being rendered.

Thus, another embodiment of the technology described herein comprises a method of generating a texture for use in a graphics processing system when rendering a scene for output, in which a bounding volume representative of the volume of all or part of the scene to be rendered is defined and in which an at least partially transparent object is present within the bounding volume, the method comprising:

generating a graphics texture comprising an array of texture texels for use when rendering the at least partially transparent object in the scene by:

setting the texel values in the texture such that they each store one or more colour values representative of the colour of the surface of the bounding volume in a given direction from a reference position that the texture is to be sampled with respect to, the reference position being located within the at least partially transparent object in the scene; and storing data representing the texel values of the texture and indicating the reference position that the texture is to be sampled with respect to.

Another embodiment of the technology described herein comprises an apparatus for generating a texture for use in a graphics processing system when rendering a scene for output, in which a bounding volume representative of the volume of all or part of the scene to be rendered is defined and in which an at least partially transparent object is present within the bounding volume, the apparatus comprising processing circuitry configured to:

generate a graphics texture comprising an array of texture texels for use when rendering the at least partially transparent object in the scene by:

setting the texel values in the texture such that they each store one or more colour values representative of the colour of the surface of the bounding volume in a given direction from a reference position that the texture is to be sampled with respect to, the reference position being located within the at least partially transparent object in the scene; and storing data representing the texel values of the texture and indicating the reference position that the texture is to be sampled with respect to.

Another embodiment of the technology described herein comprises a texture for use in a graphics processing system when rendering a scene for output, in which a bounding volume representative of the volume of all or part of the scene to be rendered is defined and in which an at least partially transparent object is present within the bounding volume, the texture comprising:

an array of texture texels, in which:

the texel values are set such that they each store one or more colour values representative of the colour of the surface of the bounding volume in a given direction from a reference position that the texture is to be sampled with respect to, the reference position being located within the at least partially transparent object in the scene.

As will be appreciated by those skilled in the art, these embodiments of the technology described herein can, and in an embodiment do, include any one or more or all of the optional features of the technology described herein described herein, as appropriate.

Thus, for example, the texture is in an embodiment in the form of a cube texture (a cube map). Similarly, in an embodiment, as well as storing one or more colour values (e.g. colour channels) (e.g. one or more RGB colour channels), the texture in an embodiment also stores additional information, e.g. in one or more additional data channels. The one or more additional channels in an embodiment comprise an alpha (transparency) value channel. In an embodiment, the additional information, e.g. that is stored in an additional data channel(s) e.g. alpha channel, is used to indicate one or more of: the transparency of the surface of the bounding volume that the texture is to be used in relation to in the direction in question, and other information or properties that relates to the scene being rendered, such as in relation to the object itself (in the direction in question) (as discussed above). Thus additional relevant information for the rendering of the refraction effect may be, and is in an embodiment, encoded in (e.g. the alpha channel of) the texture.

The (colour values for the) texture is in an embodiment generated by rendering an image of a surface for the bounding volume from the viewpoint of the reference position for the texture (from the texture reference position). In an embodiment, the at least partially transparent object within the scene is not considered (e.g. is culled from rendering) when this is done. The apparatus may, e.g., comprise any suitable processor that can do this, such as a graphics processor, a CPU, etc.

The additional information (if present) can be generated in a corresponding manner, e.g. in the same rendering pass or using one or more additional passes, and with or without the at least partially transparent object being present (as appropriate).

For example, where the additional information indicates (encodes) a region or regions of the at least partially transparent object for which refraction does not take place, such as one or more regions where one or more holes are present and/or where the object is fully opaque, then the information could be generated, e.g. by rendering the object from the inside, and then, e.g. setting the alpha channel of each texel to 1 for regions where there is a surface and to 0 for regions where there is a hole (or vice versa).

Where the additional information indicates one or more areas of the bounding volume through which a far environment, such as sky, can be seen, then the addition information could be generated, e.g. by performing an additional rendering pass without the at least partially transparent object being present, and then e.g. encoding the information in the alpha channel of the texture, e.g. by combining the result of the additional rendering pass with the result of the (RGB) rendering pass(es).

The reference position should be within the at least partially transparent object that is present in the scene. In an embodiment, the reference position is located at or near the centre of the object (as discussed above, this then means that the texture will effectively represent the colour of the surface of the bounding volume "as seen" from the object).

The generated texture is in an embodiment stored, e.g. on an appropriate portable storage medium, such as a DVD, or in memory, for future use by a graphics processing pipeline, when it is desired to use the texture when rendering, e.g., an image.

In an embodiment, the texture is stored (encoded) as a set of mipmaps (i.e. where multiple versions of the original texture each having different levels of detail (resolution) are stored for use).

In an embodiment, the texture is generated in advance of its requirement, e.g. "offline" (rather than being generated in "real-time" as and when it is needed). This is particularly useful and appropriate where, for example, the environment surrounding the object is "static", i.e. does not change with time.

As discussed above, a particular advantage of embodiments of the technology described herein is that because the texture that is used to represent the colour values can, in effect, be a "static" texture, it does not need to be generated in real-time, and can therefore, accordingly, be subjected to one or more non-real-time optimisations, if desired. Thus, in an embodiment, the texture is subject to one or more processing operations after it has been generated (and before it is stored for use), such as, and in an embodiment, one or more filtering processes, such as having one or more convolution filters applied to it. In an embodiment the texture is subjected to one or more of: blurring; brightness processing; contrast processing (e.g. enhancement); sharpening, etc. In an embodiment, the texture is subjected to one or more non-real-time optimisations.

In an embodiment, the texture is also compressed before it is stored. Any suitable texture compression process can be used for this.

In other embodiments, the texture can be at least partially generated in "real-time" (or "run-time"), e.g. as and when it is needed. This is particularly useful and appropriate where, for example, the environment surrounding the object is "dynamic", i.e. changes with time (there may be, for example, other objects moving in the scene, etc.). Real-time techniques, such as rendering-to-texture, can be used to do this.

The texture can, for example, be generated and/or updated periodically, e.g. once per frame or once per set of plural frames. Additionally or alternatively, the texture can be generated and/or updated as and when it is needed. Thus, for example, the texture can be generated and/or updated as and when the environment surrounding the object changes, and/or as and when the benefits of not updating the texture are outweighed by the reduction in image quality, etc.

Similarly, the entire texture can be generated and/or updated in real-time, or only part (some but not all) of the texture can be generated and/or updated in real-time. Thus, for example, in one embodiment, each face of the texture is separately generated and/or updated in real-time (for example, one face of the texture could be updated per frame or per set of plural frames).

It will be appreciated that in these embodiments, generating and/or updating the texture less often than every frame and/or generating and/or updating less than all of the texture will advantageously reduce the processing, memory and bandwidth requirements of the system.

In an embodiment, as well as generating the texture, the bounding volume that the texture represents (is to be used with) is also generated and stored. This bounding volume should, and in an embodiment does, represent the volume of all or part of a scene to be rendered that the texture is to be used in conjunction with.

In an embodiment data defining the bounding volume that the texture is to be used in conjunction with is generated and stored in association with (associated with) the texture. The bounding volume is in an embodiment defined in world space and is in an embodiment aligned to the colour-indicating texture. Again, this bounding volume information can be subject to any desired post-processing operations, such as compression, if desired.

As discussed above, the colour indicating texture is in an embodiment generated by rendering an image that will represent the surface of the bounding volume from the viewpoint of the reference position for the texture. This is in an embodiment done by sampling respective positions on the surface (the image representing the surface) for respective positions on the bounding volume (in the relevant direction from the reference position for the texture). In this process, as the bounding volume will typically be an approximation of the actual scene (e.g. room) being defined, the bounding volume may not match exactly to the surface of the scene (e.g. room) being defined (e.g. where the, e.g. walls of the room may be uneven or have surface roughness). To allow for this when generating the texture, the points of the surface that are sampled for the texture (for each texel), can be, and are in an embodiment, allowed to, fall on, outside of or inside the bounding volume (rather than the sampling points being constrained to be on the walls of the bounding volume). This will avoid holes being introduced within the texture where the bounding volume does not match exactly with the scene geometry. The surface is in an embodiment sampled at a position as close to the corresponding position on the bounding volume (in the relevant direction from the reference position for the texture) as possible, as the further a sampling point is from the bounding volume, the greater the error that will be introduced when using the texture, particularly when making a local correction. Accordingly, the bounding volume is in an embodiment defined such that it matches the scene (the surface defining the scene) closely (in an embodiment as closely as possible), such that the texture can be generated using samples near to (as near as possible to) the walls of the bounding volume.

In an embodiment, plural textures, and, in an embodiment, corresponding bounding volumes, are generated and stored, e.g. for respective scenes and/or objects that it is anticipated may be displayed when executing the application, e.g. game, that the textures and scenes relate to. For example, where a game will include plural scenes, such as rooms, that could contain at least partially transparent objects for which refraction may be relevant, in an embodiment respective colour-indicating textures and bounding volumes are generated for each scene (e.g. room) that could fall to be displayed when the game is played. The textures and bounding volumes can then be stored, e.g., with the remaining game data for use when the game is being executed.

Additionally or alternatively, plural textures, and, in an embodiment, corresponding bounding volumes, may be generated and stored, e.g. one for each of plural at least partially transparent objects within a scene.

As described above, embodiments of the technology described herein is particularly suitable for taking into account the effects of refraction, e.g. of a "static" environment, through an at least partially transparent object when rendering a scene.

Another particularly challenging rendering situation arises when it is desired to render a scene in which an object appears behind (i.e. relative to the viewpoint (camera) position of the scene) or inside a transparent or semi-transparent object, particularly where either or both of the objects and/or the viewpoint position are dynamically moving or changing. In this case, the effect of refraction by the transparent or semi-transparent object will be to (potentially) distort the view of the object that is behind or inside the transparent or semi-transparent object.

In an embodiment, in order to take these effects into account, the appropriate colours for sampling positions on the surface of the at least partially transparent object ("first") object are determined using a texture representative of the ("second") object that is at least partially behind and/or within the first object, with the texture being sampled using texture coordinates derived from a "refracted" view vector, e.g. that takes into account refraction of the view vector by the first object.

Thus, in an embodiment, the method of the technology described herein, further comprises:

when rendering the scene in which a or the at least partially transparent first object and a second object are present in the scene, the second object being at least partially behind and/or within the first object:

for at least one sampling position on a surface of the first object, determining the colour to be used to represent the part of the second object that will be visible through the first object at the sampling position by:

using a view vector from a viewpoint position for the scene to determine a refracted view vector for the sampling position;

using the refracted view vector to determine texture coordinates to be used to sample a graphics texture that represents the second object; and using the determined texture coordinates to sample the graphics texture to determine a colour for the sampling position to be used to represent the part of the second object that will be visible through the first object at the sampling position.

Correspondingly, in an embodiment the graphics processing pipeline of the technology described herein is configured, when rendering a scene in which a or the at least partially transparent first object and a second object are present in the scene, the second object being at least partially behind and/or within the first object, to:

for at least one sampling position on a surface of the first object, determine the colour to be used to represent the part of the second object that will be visible through the first object at the sampling position by:

using a view vector from a viewpoint position for the scene to determine a refracted view vector for the sampling position;

using the refracted view vector to determine texture coordinates to be used to sample a graphics texture that represents the second object; and using the determined texture coordinates to sample the graphics texture to determine a colour for the sampling position to be used to represent the part of the second object that will be visible through the first object at the sampling position.

The Applicants furthermore believe that these techniques are new and advantageous in their own right.

Thus, a further embodiment of the technology described herein comprises a method of operating a graphics processing system when rendering a scene for output, the method comprising:

when rendering a scene in which a first at least partially transparent object and a second object are present in the scene, the second object being at least partially behind and/or within the first object:

for at least one sampling position on a surface of the first object, determining the colour to be used to represent the part of the second object that will be visible through the first object at the sampling position by:

using a view vector from a viewpoint position for the scene to determine a refracted view vector for the sampling position;

using the refracted view vector to determine texture coordinates to be used to sample a graphics texture that represents the second object; and using the determined texture coordinates to sample the graphics texture to determine a colour for the sampling position to be used to represent the part of the second object that will be visible through the first object at the sampling position.

A further embodiment of the technology described herein comprises a graphics processing pipeline comprising:

a plurality of processing stages, including at least a rasteriser that rasterises input primitives to generate graphics fragments to be processed, each graphics fragment having one or more sampling positions associated with it, and a renderer that processes fragments generated by the rasteriser to generate output fragment data;

wherein the graphics processing pipeline is configured, when rendering a scene in which a first at least partially transparent object and a second object are present in the scene, the second object being at least partially behind and/or within the first object, to:

for at least one sampling position on a surface of the first object, determine the colour to be used to represent the part of the second object that will be visible through the first object at the sampling position by:

using a view vector from a viewpoint position for the scene to determine a refracted view vector for the sampling position;

using the refracted view vector to determine texture coordinates to be used to sample a graphics texture that represents the second object; and using the determined texture coordinates to sample the graphics texture to determine a colour for the sampling position to be used to represent the part of the second object that will be visible through the first object at the sampling position.

These further embodiments of the technology described herein are directed to a method of and apparatus for taking account of the effects of refraction when rendering a scene for output, in particular in the situation where there is at least one "first" at least partially transparent (i.e. not fully opaque) object in the scene being rendered together with at least one "second" object present within the scene, where the second object is at least partially behind (i.e. with respect to the main viewpoint (camera) position for the scene) and/or at least partially within the first object. In these further embodiments of the technology described herein, to take into account the effects of refraction of the second object by the first object, the appropriate colours for sampling positions on the surface of the first object are determined using a texture representative of the second object, with the texture being sampled using texture coordinates derived from a "refracted" view vector, e.g. that takes into account refraction of the view vector by the first object.

As will be discussed further below, the Applicants have recognised that this arrangement can be used to simulate real-world physical effects of refraction in a particularly efficient manner. This then means that real-world physical effects of refraction can be simulated during real-time rendering (i.e. at "run-time") and/or when rendering in situations where the processing power of the graphics processing system is limited.

These further embodiments of the technology described herein can accordingly improve the rendering quality (and facilitate simulation of the real-world physical effects of refraction) while reducing the processing, memory, bandwidth and power requirements of the graphics processing system, and can facilitate simulation of real-world physical effects of refraction through a fully or partially transparent object in a scene during real-time rendering (i.e. at "run-time") and/or when rendering in situations where the processing power of the graphics processing system is more limited.

As will be appreciated by those skilled in the art, these further embodiments of the technology described herein can, and in an embodiment do, include any one or more or all of the optional features of the technology described herein described herein, as appropriate. Equally, these further embodiments can be combined with any one or more or all of the embodiments described herein, as appropriate.

Thus, in particular, the techniques described above may be used to take into account the effects of refraction of the environment as seen through an at least partially transparent "first" object present in the scene, while these further embodiments of the technology described herein may be used to take into account the effects of refraction of at least one "second" object as seen through a or the at least partially transparent first object, where the second object is at least partially behind and/or at least partially within the first object.

The first at least partially transparent object that is considered in the technology described herein should be (and in an embodiment is) a transparent or semi-transparent (i.e. not fully opaque) object, i.e. such that the effects of refraction are relevant. All of the object may be at least partially transparent, or only a part (some but not all) of the object may be at least partially transparent.

The first object may be a static object (i.e. that does not move or change in the scene) or a dynamic object (i.e. that moves and/or changes with time), as desired.

The first object may take any suitable and desired shape and/or size. For example, the shape of the first object may be flat and/or relatively more complex, i.e. other than simply flat (is not flat), e.g. such that the effects of refraction will be relatively complex, e.g. such that the view of the scene (including at least the second object) behind or within the first object will be distorted by the first object.

The first object may comprise a "solid", non-hollow object, or be other than a "solid" object, e.g. is an object made up of multiple (e.g. two or more) portions separated by a medium having a different refractive index, for example a hollow object, a concave object such as a glass, etc.

The second object that is considered in the technology described herein may be any suitable such object present in the scene being rendered.

The second object should be (and in an embodiment is) at least partially visible through the first object. The second object is in an embodiment opaque, but it would also be possible for the second object to be partially transparent (i.e. not fully transparent).

The second object may be a static object, but is in an embodiment a dynamic object, i.e. an object that moves and/or changes with time (e.g. that is animated) in the scene. The second object may take any suitable and desired shape and/or size.

The second object should be (and in an embodiment is) at least partially behind the first object (i.e. with respect to (when looking from) the main viewpoint (camera) position of the scene) and/or at least partially within the first object (i.e. the second object is in an embodiment at least partially occluded by the first object when considered from the main viewpoint position), in an embodiment such that at least one surface of the first object is present in the scene between the main viewpoint (camera) position and the second object, i.e. such that the effects of refraction of the second object by the first object are relevant. All of the second object may be behind or within the first object, or only a part (some but not all) of the second object may be behind and/or within the first object.

The graphics texture that represents the second object can take any suitable and desired form. In an embodiment, the graphics texture comprises a two-dimensional texture, e.g.

comprising a two-dimensional array of texels, where each texel can in an embodiment be uniquely identified by a set of texture coordinates.

As will be described in more detail below, the texture in an embodiment represents the second object as seen from an "auxiliary" viewpoint (camera) position that is on a vector that terminates at (i.e. that starts or ends at) the (e.g., centre of the) (bounding box of the) first and/or second object and that passes through the main viewpoint position for the scene. When compared with the main viewpoint position, the auxiliary viewpoint position may be closer to or further away from the first and/or second object, or it may be at the same position as the main viewpoint position, in an embodiment so long as it remains on the vector that terminates at the (centre of the) first and/or second object and that passes through the main viewpoint position. The graphics texture in an embodiment represents the second object as seen from the auxiliary viewpoint when (directly) facing the second object.

Thus, it will be appreciated that in an embodiment the graphics texture represents the second object as seen from an angle defined by the main viewpoint position, but with a scale (size) defined by the auxiliary viewpoint position.

The scale (size) of the representation of the second object in the graphics texture may be selected as desired, e.g. by effectively moving the auxiliary viewpoint position closer to or further away from the (centre of the) first and/or second object (along the vector that terminates at the (centre of the) first and/or second object and that passes through the main viewpoint position for the scene). In an embodiment, the scale of the representation of the second object in the graphics texture is fixed and/or predefined, in an embodiment by fixing and/or predefining the distance between the (centre of the) first and/or second object and the auxiliary viewpoint position (in world space).

The graphics texture should (and in an embodiment does) represent the second object as it would be seen were the first object (and in an embodiment any other objects in the scene) not present, i.e. in an embodiment without any kind of distortions introduced due to refraction. Thus, the graphics texture in an embodiment represents (only) the second object (in an embodiment as seen from the auxiliary viewpoint position) absent the first object (and in an embodiment absent any other objects in the scene).

It would also be possible for the graphics texture to comprise a three-dimensional texture that, e.g., represents (only) the entire second object, in an embodiment absent the first object (and in an embodiment absent any other objects in the scene).

The texture should, and in an embodiment does, store one or more colour values (e.g. all three RGB colour values) indicative of the colour of the second object, e.g. at the various texel positions.

The texture could store the colour values alone (i.e. store one or more RGB colour channels only) (and may in an embodiment be an RGB texture). Alternatively, the texture could also store one or more other data channels, such as an alpha (transparency) channel (e.g. the texture may be an RGBα texture (and in an embodiment, this is done)). In this case, the alpha (transparency) data channel could be used for different purposes. For example, an RGBα texture could be used to store a texture to be used in the manner of the technology described herein in the RGB colour channels, and also to store a second texture for other purposes in the alpha channel. This would then allow the same texture to be used for different purposes.

In an embodiment where the texture also includes an alpha channel, the alpha channel is used to represent the transparency of the second object (i.e. the texture may comprise a transparency (alpha) channel).

In an embodiment where the texture also includes a transparency channel, the transparency channel is also used in the method of the technology described herein, for example as a further, transparency, parameter to be used together with the RGB colour values when calculating the effect of refraction.

In the technology described herein, the colour to be used to represent the part of the second object that will be visible through the first object at a sampling position on a surface of the first object is determined by using a view vector from the main viewpoint (camera) position to determine a refracted view vector for the sampling position (for which the colour is required) (i.e. the path of the view vector from the viewpoint (camera) position to the second object taking account of the effects of refraction as the view vector passes through the surface of the first object at the sampling position in question).

This can be determined in any suitable and desired manner.

In one embodiment, the view vector from the main viewpoint (camera) position to the sampling position (in world space) is determined, and then the refracted view vector is determined from the sampling position view vector. In one embodiment, the vectors from the main viewpoint (camera) position to the vertices of the primitive that the sampling point being considered relates to are determined, and then the vector from the main viewpoint (camera) position to the sampling point is determined by appropriate (e.g. hardware) interpolation of those viewpoint to vertex vectors. The viewpoint to vertex vectors are in an embodiment calculated in the world space. In an embodiment, for each vertex, the vector from the viewpoint to the vertex is determined. The vector from the viewpoint position to the sampling point is in an embodiment then determined by appropriate interpolation of the viewpoint to vertex vectors, and then is in an embodiment used to determine the refracted view vector.

In another embodiment, the vectors from the viewpoint (camera) position to the vertices of the primitive that the sampling point being considered relates to are determined (in world space), and then these vectors are each used to calculate a refracted view vector for each vertex. In an embodiment, for each vertex, the vector from the viewpoint to the vertex is determined and the corresponding refracted view vector is calculated. The refracted view vector for the sampling point is in an embodiment then determined by appropriate (e.g. hardware) interpolation of the vertex refracted view vectors.

Other arrangements would, of course, be possible.

The viewpoint to sampling point vector (whether generated by interpolation from viewpoint to vertex vectors or otherwise) or the viewpoint to vertex vector(s) can be used to determine the corresponding refracted view vector(s) in any manner as desired.

The determination of the refracted view vector(s) from the view vector(s) is in an embodiment carried out by considering the effects of refraction on (each of) the view vector(s), e.g. as it passes through the surface of the first object. Thus, in an embodiment, using the view vector to determine the refracted view vector comprises determining the change in direction of the view vector due to refraction of the view vector at the surface of the first object.

The effect of refraction is to (potentially) alter the direction of a light ray as it passes from a first medium having a first refractive index (e.g., $n_1$) to a second medium having a second, different refractive index (e.g., $n_2$) (i.e. where $n_1 \neq n_2$).

The degree by which the direction is altered is given by Snell's law:

$$\frac{\sin \theta_1}{\sin \theta_2} = \frac{n_2}{n_1}$$

where $\theta_1$ is the angle of incidence of the incoming light ray measured from the normal of the boundary between the two media, and $\theta_2$ is the angle of refraction of the refracted ray measured from the normal of the boundary.

In embodiments of the technology described herein, the refracted view vector is determined from the view vector, e.g. as it passes through the surface of the first object. Thus, the environment surrounding the first object within the scene in an embodiment corresponds to the "first medium", and the first refractive index $n_1$ in an embodiment corresponds to the refractive index of the environment surrounding the first object. The surrounding medium may be considered as being, e.g., air, and so the first refractive index will typically be (and in one embodiment is) equal to 1 (i.e. $n_1=1$). The environment surrounding the first object (the "first medium") may, of course, comprise other materials having the same or different refractive indices, such as water, etc.

Correspondingly, in the arrangement of an embodiment, the first object corresponds to the "second medium", and the so second refractive index $n_2$ in an embodiment corresponds to the refractive index of the first object.

The first object may have a single, uniform refractive index, or it may have a non-uniform refractive index that, e.g., changes as a function of position within the object.

The refractive indices for the surrounding medium and the first object can be provided and defined in any suitable and desired manner, for example as one or more single values (e.g. where the object and/or medium have uniform refractive indices). A non-uniform (e.g. varying in three-dimensions) refractive index could be indicated (stored), for example, using a graphics texture.

In an embodiment, in order to determine the refracted view vector from the view vector, the normal of the surface of the first object at the sampling position or vertex in question is determined and used. Thus, in an embodiment, the process comprises using the normal vector of the surface of the first object at the sampling point or vertex to determine the refracted view vector. This may be done in any manner as desired, but as will be discussed further below, in an embodiment, this is done by determining and using the normal of the primitive on the surface of the first object that the sampling position lies on or that the vertex relates to.

The refracted view vector may be determined in any appropriate and desired manner, e.g. based on Snell's law (as described above) using the dot product of the normalised view vector (incident vector) and the normal vector, Pythagoras's theorem, and the ratio between the refractive indices.

In an embodiment, a predefined "refract" function is used to determine the refracted view vector R:

R=refract(I,N,eta)

where I is the normalized view or incident vector, N is the normalized normal vector, eta is the ratio of indices of refractions, i.e. eta=$n_1/n_2$.

Other arrangements would, of course, be possible.

For example, it would be possible to determine the refracted view vector by firstly determining the angle of incidence $\theta_1$ of the view vector, e.g. by determining the angle between the normal vector and the view vector from the main viewpoint (camera) position to the sampling point or vertex being considered, and in an embodiment then determining the angle of refraction $\theta_2$, e.g. using Snell's law (as described above). The angle of incidence $\theta_1$, the refractive index of the first medium $n_1$ (e.g. the refractive index of the medium surrounding the first object), and the refractive index of the first object $n_2$ may be used in Snell's law to determine the angle of refraction.

The refracted view vector may then be determined using the angle of refraction $\theta_2$, e.g. by effectively rotating the view vector as it passes through the surface of the first object at the sampling position or vertex in question.

Thus, the refracted view is in an embodiment a vector that extends from the sampling position or vertex in question, in an embodiment substantially in the same general direction as the view vector, but at an angle equal to the angle of refraction $\theta_2$ measured from the normal of the surface of the first object at the sampling position or vertex, and in an embodiment in the plane defined by the normal vector and the view vector.

In various embodiments, relatively more complex effects of refraction can be taken account of, in an embodiment when determining the refracted view vector.

Thus, for example, where the first object has a non-uniform refractive index, the determination of the refracted view vector from the view vector may comprise more complex calculations, that e.g. consider the path of the view vector as it passes through the regions of different refractive indices, if desired.

Additionally or alternatively, the effects of a changing or moving medium (such as, e.g., flowing water) within the first object may be (approximately) taken into account by animating the refracted view vector. The properties of the animation may be selected as desired to, e.g., represent the changes in the medium with time. For example, a sinusoidal variation or some other function could be applied to the refracted view vector to animate it. This represents a particularly simple and efficient technique for rendering such media, e.g. in which it is not necessary to directly determine the effects of the changes in the medium on the refracted view vector. Thus, in an embodiment, the process comprises animating the refracted view vector (i.e. varying (perturbing) it, e.g., and in an embodiment, in terms of its magnitude and/or direction, over time).

Additionally or alternatively, the effects of chromatic aberration can be taken into account by, e.g., determining plural (slightly) different refracted view vectors (e.g. one per (RGB) colour channel of the texture), and using each of the refracted view vectors to sample the texture for each of the colour channels (in an embodiment in the manner of the technology described herein).

The determined refracted view vector(s) for the sampling position may be output and used "as is" in the further stages of the graphics processing pipeline, but may be (and in one embodiment is or are) firstly normalised before this is done (i.e. if necessary). Accordingly, in an embodiment the refracted view vector is a unit vector that extends from the sampling position in question in a direction defined by the angle of refraction $\theta_2$ in the plane defined by the normal vector and the view vector.

These processes can be carried out by any desired and suitable stage or component of the graphics processing pipeline. In an embodiment, these processes are performed by a vertex shading stage of the graphics processing pipeline, in an embodiment by that stage executing an appropriate vertex shading program (vertex shader) to determine the refracted view vector, and then outputting the refracted view vector for use by other stages of the graphics processing pipeline. It would also be possible for a fragment shading stage of the graphics processing pipeline to perform some or all of these processes.

The refracted view vector may be used to determine texture coordinates to be used to sample the graphics texture that represents the second object in any desired and suitable manner.

In an embodiment, this process comprises firstly determining "un-modified" texture coordinates for the sampling position in question, and then using the refracted view vector to modify those texture coordinates (if necessary) to arrive at the texture coordinates to be used to sample the graphics texture.

The un-modified texture coordinates are in an embodiment determined by mapping the graphics texture that represents the second object onto the surface of the first object and then determining the appropriate (un-modified) texture coordinates for the sampling position in question.

This may be done, e.g., by mapping the graphics texture onto the front surface of the first object, or by mapping the graphics texture onto the back surface of the first object. The texture may be mapped onto the front or back surface of the first object, e.g. depending on the position of the second object relative to the first object. For example, in an embodiment, the texture is mapped onto the front surface of the object where the second object is inside of the first object. Similarly, in an embodiment the texture is mapped onto the front and/or back surface of the first object where the second object is behind the first object.

When determining the un-modified texture coordinates, the graphics texture may be mapped onto the surface of the first object in any suitable and desired manner. However, in an embodiment, the texture is mapped onto the (front or back) surface of the first object as if the texture was projected onto a projection plane within or behind the first object (i.e. using projective texture mapping).

Thus, in an embodiment, a projection plane is defined that is inside or behind the first object. The projection plane is in an embodiment orthogonal to the vector that terminates at the (centre of the) (bounding box of the) first and/or second object and that passes through the main viewpoint position for the scene, and is in an embodiment located at a position defined by the position of the second object.

In an embodiment, the projection plane is located at the (centre of the) first object. However, it would also be possible to locate the projection plane at the (centre of the) second object and/or to move the projection plane to be relatively closer to or further away from the main viewpoint (camera) position (i.e. along the vector that terminates at the (centre of the) first and/or second object and that passes through the main viewpoint position for the scene), to, e.g., effectively exaggerate or reduce the refraction effect.

As discussed above, the so-determined un-modified texture coordinates are in an embodiment then modified (if necessary), in an embodiment using the refracted view vector, to arrive at the texture coordinates to be used to sample the graphics texture. This is in an embodiment done by considering the difference between the view vector and the refracted view vector (if any). Thus, in an embodiment, the step of determining the texture coordinates to be used to sample the graphics texture that represents the second object comprises using the refracted view vector to modify the determined un-modified texture coordinates.

In an embodiment, a difference between the view vector and the refracted view vector at a position of the second object is determined and this difference is then used to modify the un-modified texture coordinates. This is in an embodiment done by determining the difference between the view vector and the refracted view vector at the projection plane.

Thus, in an embodiment the position on the projection plane intersected by the view vector is determined, and the position on the projection plane intersected by the refracted view vector is in an embodiment also determined (in an embodiment in world space). A difference vector is in an embodiment then determined as the vector between the view vector intersection point and the refracted view vector intersection point (in an embodiment in world space).

The difference vector is in an embodiment then used to modify the texture coordinates (if necessary), i.e. to arrive at the texture coordinates to be used to sample the graphics texture representing the second object for the sampling position in question (i.e. to determine the colour to be used to represent the part of the second object that will be visible through the first object at the sampling position considering the effects of refraction). This may be done in any suitable and desired manner, but in an embodiment, the difference vector is in an embodiment firstly transformed from world space into the space in which the texture is defined, and then the texture space definition of the difference vector is in an embodiment applied to modify the un-modified texture coordinates that were determined for the sampling point in question, e.g. by vector addition, as appropriate.

Other processes would, of course, be possible.

These processes can again be carried out by any desired and suitable stage or component of the graphics processing pipeline. In an embodiment, these processes are performed by a vertex shading stage of the graphics processing pipeline, in an embodiment by that stage executing an appropriate vertex shading program (vertex shader) to determine the texture coordinates to be used to sample the graphics texture that represents the second object, and then outputting the determined texture coordinates for use by other stages of the graphics processing pipeline.

The resulting texture coordinates are used to sample the graphics texture to determine the colour for the sampling position to be used to represent the part of the second object that will be visible through the first object at the sampling position in question.

Where the graphics texture also includes an alpha channel, then the resulting texture coordinates should also be used (and in an embodiment are used) to sample the alpha value(s) stored in the alpha channel.

Accordingly, it will be appreciated that in embodiments of the technology described herein, where there is a difference between the view vector and the refracted view vector (at the position of the second object), i.e. due to refraction of the view vector by the first object, then the texture coordinates that are used to sample the graphics texture that represents the second object are appropriately modified so that the colour that is sampled from the texture and used for the sampling position in question will effectively represent the part of the second object that will be visible through the first object at the sampling position taking into account the effects of refraction (and correspondingly, where there is no difference between the view vector and the refracted view vector (at the position of the second object) due to the absence of refraction of the view vector by the first object, then the un-modified texture coordinates are in an embodiment not modified). As discussed above, this represents a particularly convenient and efficient technique for determining "real-world" physical effects of refraction when an object is present behind or within a transparent or semi-transparent object.

The texture can be sampled in any desired and suitable manner. For example, appropriate filtering (interpolation) processes, such as bilinear filtering, can be used when sampling the texture, if desired. Similarly, in the case where the texture is provided as a set of mipmaps, the sampling process is in an embodiment configured to filter (interpolate) the mipmaps to provide the sampled texture value, for example (and in an embodiment) using tri-linear filtering.

Where the texture is in the form of a set of mipmaps, the sampling process in an embodiment also comprises determining the mipmap level or levels (the level of detail) at which the texture should be sampled (and then sampling the so-determined mipmap level(s) for the texture).

Other arrangements would, of course, be possible.

These processes can again be carried out by any desired and suitable stage or component of the graphics processing pipeline. In an embodiment they are performed by a fragment shading stage (a fragment shader) of the graphics processing pipeline, in an embodiment by executing an appropriate fragment shading program. They may also or instead be performed at least in part by an appropriate texture mapping stage of the graphics processing pipeline, if desired.

Once the texture has been sampled, the sampled colour for the second object can then be used as desired, e.g. in an, e.g. conventional, calculation that determines the colour of the sampling point on the surface of the first object being considered.

The sampled colour for the sampling point can be used as desired to simulate the effect of refraction at the sampling point. The determined colour is in an embodiment used when determining the output, rendered, colour to be used for the sampling position. Thus, the sampled colour from the texture is in an embodiment used for the sampling position in question.

Thus, in an embodiment, the method of the technology described herein further comprises using (and the graphics processing pipeline of the technology described herein is further configured to use) the determined colour for the sampling position when rendering an output version of the sampling position. In a particular embodiment, the determined colour is used to represent the part of the second object that will be visible through the first object at the sampling position.

The determined colour may be used "as is", i.e. as the final colour that is determined and output for the sampling position in question by the rendering process (e.g. as the final colour that is displayed for the sampling position in question). Alternatively, the determined colour may be combined (e.g. blended) with one or more other colours determined for the sampling position in question and/or modified, e.g. by one or more other stages in the rendering process.

Thus, for example, in one particular embodiment, the determined colour (i.e. that represents the part of the second object that will be visible through the first object at the sampling position) is combined (blended) with the colour of the first object at the sampling position in question. In an embodiment, the fact that the visibility of the second object through the first object should depend on the transparency of the first object is taken into to account here, e.g. by using an appropriate alpha value for the first object in the combining (blending) operation. In an embodiment, the (relative) visibility of the second object is increased as the transparency of the first object increases, and vice-versa.

Additionally or alternatively, one or more further graphical effects may be applied to the sampling position in question, e.g., to modify the colour of the sampling position, such as lighting effects, reflections, etc.

Similarly, where the alpha channel of the texture is also sampled, the sampled transparency information for the sampling point can be used as desired to simulate the effect of refraction at the sampling point.

These processes can again be carried out by any desired and suitable stage or component of the graphics processing pipeline. In an embodiment they are performed by the renderer of the graphics processing pipeline, and in an embodiment by a fragment shading stage of the graphics processing pipeline (again in an embodiment by executing an appropriate fragment shading program that performs the desired rendering calculations).

As will be appreciated, it may be the case that for one or more sampling positions on the surface of the first object, the second object is not in fact visible through the first object at the sampling position in question. This may be accounted for in an embodiment of the technology described herein by arranging for the texture that represents the second object to have no colour and/or an entirely transparent ($\alpha=0$) colour at the one or more appropriate texels, e.g. such that there will in an embodiment be no contribution to the colour for the sampling position(s) in question from the texture that represents the second object in the combining (blending) operation described above.

It would also be possible to simply avoid performing the technique of the technology described herein for one or more sampling positions on the surface of the first object if it is determined that the second object is not visible through the first object at the one or more sampling positions.

In an embodiment, a bounding volume (e.g. a bounding sphere or box) for the second object is first used to determine if the second object could be visible from the current viewpoint, and if it is determined that the second object is not visible from the current viewpoint, further processing for the second object is omitted.

In an embodiment, for one or more of the one or more sampling positions on the surface of the first object for which the second object is not visible through the first object, a colour to be used to represent the part of the scene (i.e. other than the second object) that will be visible through the first object at the sampling position in question is in an embodiment determined.

This may be done in any suitable and desired manner, however this process in an embodiment uses the refracted view vector so as to take into account the effects of refraction by the first object. In an embodiment, this is done using the techniques of the first and second embodiments of the technology described herein and their embodiments (i.e. by sampling a "cubemap"), as described above.

It would also be possible to use these techniques for sampling positions on the surface of the first object for which the second object is visible, but where the second object is at least partially transparent, to e.g. determine a colour contribution for the part of the scene that is visible through the second object at the sampling position in question. In this case, the determined colour contribution is in an embodiment combined (blended) in the combining operation described above.

Thus, it will be appreciated that in accordance with embodiments, any one or more or all of the (refracted)

second object, the (refracted) parts of the scene (other than the second object) behind the surface of the first object, the back surface of the first object, and a combination (blend) of these, may appear (and be rendered to appear) on different parts of the surface of the first object.

Any or all of the above processes could be performed for sampling points individually, or some or all of them could be performed for sets of plural sampling points (which would then have the effect of performing the process for the sampling points within the set that is being considered). For example, where the graphics processing pipeline operates on fragments that each represents a set of plural sampling positions, the process of the technology described herein could be performed on a per-fragment basis, rather than individually for each sampling point that a fragment represents (and in an embodiment this is what is done). In this case, there would accordingly be, e.g., a single colour determined for a fragment, which would then be used for each sampling point that the fragment is being used to render.

It will be appreciated that although the technology described herein has been described above with particular reference to determining a colour at a given sampling point on the surface of the first object in question, the technique of the technology described herein can be, and in an embodiment is, used for plural sampling points on the surface of the first object, and in an embodiment for each sampling point on the surface of the first object for which refraction needs to be considered when rendering the scene. Thus, the process is in an embodiment repeated for each of plural sampling points on the surface of the first object that is being considered.

The surface of the first object will typically be (and in an embodiment is) represented in the rendering process by one of more (and in an embodiment plural) primitives. Thus, in an embodiment, the process comprises (and the pipeline is configured to): rendering the first object by rendering one or more at least partially transparent primitives that represent the surface of the first object, and for at least one sampling position on at least one of the one or more primitives, determining the colour to be used to represent the part of the second object that will be visible through the primitive at the sampling position in the manner of the technology described herein. The process is in an embodiment repeated for each sampling position on the primitive, and in an embodiment for each of plural at least partially transparent primitives that make up the surface being considered.

In one embodiment, a single rendering pass is used to determine the effects of refraction through the first object (i.e. in the manner described above). Thus, in an embodiment, the step determining the colour to be used to represent the part of the second object that will be visible through the first object at the sampling position is performed as part of a single rendering pass.

Although a single rendering pass may be used for any at least partially transparent (first) object, as desired, the Applicants have found that this is particularly appropriate and useful where, for example, the first object comprises a "solid", non-hollow object (e.g., such that the view vector will only interact with the object once as it passes through and is refracted by the object). Thus, in an embodiment, where the object comprises a "solid" object, then the process for determining the effects of refraction in an embodiment comprises a single-pass process. This single rendering pass in an embodiment renders both the front and back surfaces of the object.

In another embodiment, one or more additional rendering passes may be used to render the first object. In one such embodiment, when rendering the at least partially transparent first object, in an embodiment some (but not all) of the first object is rendered in a first rendering pass, and then some or all of the remaining portion of the object is rendered in a second rendering pass (which in an embodiment corresponds to the rendering pass of the technology described herein discussed above).

Again, although two or more rendering passes may be used for any at least partially transparent object (such as a "solid" object), as desired, the Applicants have found that this is particularly appropriate and useful where, for example, the at least partially transparent second object is other than (is not) a "solid" object, e.g. is an object made up of multiple (e.g. two or more) portions separated by a medium having a different refractive index (e.g., such that the view vector will interact with the object more than once as it passes through and is refracted by the object), for example a hollow object, a concave object such as a glass, etc., and in an embodiment where the second object is inside the first object. Thus, in an embodiment, where the object comprises other than (is not) a "solid" object, and in an embodiment where the second object is inside the first object, then the process in an embodiment comprises one or more additional rendering passes (that is, two or more rendering passes in total).

In one such embodiment, the back surface (or "back faces") of the object, i.e. the surface of the object that is furthermost from the main viewpoint (camera) position for the scene (and which is in an embodiment behind the second object), is rendered in the first rendering pass, and then other portions of the object (e.g. the portions of the first object that are relatively closer to the viewpoint (camera) position for the scene such as the front surface (or "front faces") of the first object, that is in an embodiment in front of the second object) are rendered in the second rendering pass.

In the first rendering pass the portions of the first object other than the back surface (i.e. the front surface) are in an embodiment not rendered, i.e. are in an embodiment "culled" from rendering. Thus in the first rendering pass for the first object, front face culling is in an embodiment enabled.

In the first rendering pass, the back surface of the object may be rendered in a conventional manner. However, it would also be possible to, e.g., take into account the effects of refraction through the back surface. In an embodiment, this is done using the techniques of the first and second embodiments of the technology described herein and their embodiments (i.e. by sampling a "cubemap"), as described above.

In the second rendering pass, the portions of the first object other than the back surface (i.e. the front surface) of the object are in an embodiment then rendered (i.e. in the manner of the technology described herein), in an embodiment without rendering the back surface, i.e. the back surface of the object is in an embodiment "culled" from rendering. Thus in the second rendering pass for the object, back face culling is in an embodiment enabled.

The second rendering pass in an embodiment uses the results of the first rendering pass when determining the colour values for the sampling positions on the (front) surface of the object. In an embodiment the results of the first rendering pass are mixed (alpha blended) with the results of the second rendering pass, e.g. in the combining (blending) operation described above. The manner in which this is done can be selected as desired. For example, the type of blending operation and the blend factor (e.g. the relative proportions by which the results are combined) can be selected as desired.

The transparency (alpha value) of the final colour for sampling position(s) output from the second rendering pass can be selected as desired. A constant transparency (alpha value) may be defined and used for the entire object, or a transparency (alpha value) that varies across the object may be defined and used. A non-constant transparency (alpha value) could be stored, for example, in a graphics texture.

Other processes would, of course, be possible.

Regardless of the number of rendering passes used to determine the effects of refraction, one or more additional rendering passes may be used, e.g., for other purposes, if desired.

Although the technology described herein has been described above with particular reference to determining the effects of refraction caused by the first transparent or semi-transparent object on the view of a second object behind and/or inside the first object, the technique of the technology described herein can be, and in an embodiment is, used in situations where plural second objects are behind and/or inside one or more first objects. In this case, a single graphics texture could represent plural second objects and/or plural graphics textures could be provided and used, that, e.g., each represent one or more of the plural second objects, in the manner of the technology described herein.

Correspondingly, plural transparent or semi-transparent first objects could be rendered using the techniques of the technology described herein.

It would also be possible to use the techniques of the technology described herein to consider and apply recursive refractions. For example, the effects of refraction by one or more second object(s) could be considered, e.g. to introduce secondary, third (and so on) refraction effects. This could be done e.g. by applying the methods of the technology described herein to the first object and the one or more second object(s) (and so on). In this embodiment, the texture(s) should in an embodiment be prepared in an order that depends on the location of each object, e.g. and in an embodiment starting with the back-most object(s) and ending with the front-most object(s) (relative to the main viewpoint position).

The process of the technology described herein is in an embodiment repeated for plural scenes in a sequence of scenes being rendered, e.g., and in an embodiment, for each frame of a sequence of frames to be rendered, that includes one or more at least partially transparent objects for which refraction may be relevant. It may also be performed appropriately for each at least partially transparent object that is present in a scene, as and if desired.

The technology described herein also extends to the generation of the texture(s) representing the second object(s) and to the texture(s) itself. It may be, for example, that the texture(s) would be generated (and stored) separately, and/or in advance, and then, e.g., provided to a graphics processor for use. The technology described herein extends to these activities, as well as to the use of the textures for rendering refraction as described above.

Thus, another embodiment of the technology described herein comprises a method of generating a texture for use in a graphics processing system when rendering a scene for output, in which a first at least partially transparent object and a second object are present in the scene, the second object being at least partially behind and/or within the first object, the method comprising:

generating a graphics texture comprising an array of texture texels for use when rendering the scene from a main viewpoint position by:

setting the texel values in the texture such that they each store one or more colour values representative of the colour of the second object as seen from an auxiliary viewpoint position, the auxiliary viewpoint position being located on a vector that terminates at the first and/or second object and that passes through the main viewpoint position; and storing data representing the texel values of the texture.

Another embodiment of the technology described herein comprises an apparatus for generating a texture for use in a graphics processing system when rendering a scene for output, in which a first at least partially transparent object and a second object are present in the scene, the second object being at least partially behind and/or within the first object, the apparatus comprising processing circuitry configured to:

generate a graphics texture comprising an array of texture texels for use when rendering the scene from a main viewpoint position by:

setting the texel values in the texture such that they each store one or more colour values representative of the colour of the second object as seen from an auxiliary viewpoint position, the auxiliary viewpoint position being located on a vector that terminates at the first and/or second object and that passes through the main viewpoint position; and storing data representing the texel values of the texture.

Another embodiment of the technology described herein comprises a texture for use in a graphics processing system when rendering a scene for output from a main viewpoint position, in which a first at least partially transparent object and a second object are present in the scene, the second object being at least partially behind and/or within the first object, the texture comprising:

an array of texture texels, in which:

the texel values are set such that they each store one or more colour values representative of the colour of the second object as seen from an auxiliary viewpoint position, the auxiliary viewpoint position being located on a vector that terminates at the first and/or second object and that passes through the main viewpoint position.

As will be appreciated by those skilled in the art, these embodiments of the technology described herein can, and in an embodiment do, include any one or more or all of the optional features of the technology described herein described herein, as appropriate.

Thus, for example, the texture is in an embodiment in the form of two-dimensional texture map. Similarly, in an embodiment, as well as storing one or more colour value channels (e.g. one or more RGB colour channels), the texture in an embodiment also stores an alpha (transparency) value channel whose values are set according to the transparency of the second object that the texture is to be used in relation to. Other information, that is e.g. relevant to the rendering process, could also be stored in (one or more, e.g. additional, channels of) the texture.

The texture is in an embodiment generated by rendering an image of the second object from the auxiliary viewpoint position, with the "auxiliary camera" used to do this in an embodiment (directly) facing the second object. In an embodiment, the first object within the scene (and in an embodiment any other objects in the scene) is not considered (e.g. is culled from rendering) when this is done. As discussed above, this then means that the texture will effectively represent (only) the second object "as seen" from the auxiliary viewpoint position. The apparatus may, e.g., comprise any suitable processor that can do this, such as a graphics processor, a CPU, etc.

The auxiliary viewpoint position may be located at any position on the vector that terminates at (i.e. that starts or ends at) the (bounding box of the) first and/or second object and that passes through the main viewpoint position. Thus, when compared with the main viewpoint position, the auxiliary viewpoint position may be closer to or further away from the first and/or second object, or it may be at the same position as the main viewpoint position, in an embodiment so long as it remains on the vector that terminates at the (bounding box of the) first and/or second object and that passes through the main viewpoint position.

The vector may terminate (start or end) at any point at the first object or the second object. In an embodiment, the vector terminates at the second object where the second object is inside of the first object. In another embodiment, the vector terminates at the first object where the second object is behind the first object and/or is moving or may move behind the first object (e.g. is passing or may pass behind the first object). In one embodiment, where the second object may move from its position inside or behind the first object, then the vector terminates at the first object.

The location that the vector terminates should be (and in an embodiment is) consistent with the position of the projected plane. In one embodiment, the vector terminates at the second object where the graphics texture represents only a single second object. In this embodiment the projected plane is in an embodiment centred on the second object. In another embodiment, the vector terminates at the (centre of the) first object where the graphics texture represents plural second objects. In this embodiment, the projected plane is in an embodiment centred on the first object.

The vector in an embodiment terminates at the centre of the first object or the second object, although any other position within the first or second object may be used as desired and appropriate. In one embodiment, the vector terminates at the (centre of the) part of the first object that covers the second object, e.g. the part of the first object that contains or occludes the second object. In one embodiment, e.g. where the first and/or second object comprises a concave object, the vector may not terminate within the first or second object. In this case, the vector should (and in an embodiment does) terminate at the bounding box of the object.

In an embodiment, the vector terminates at the centre of the bounding box of the first object.

The distance between the (centre of the) first and/or second object and the auxiliary viewpoint position may be selected as desired. In an embodiment, the distance between the (centre of the) first and/or second object and the auxiliary viewpoint position (in world space) is fixed and/or predefined. As discussed above, this effectively means that the scale of the representation of the second object in the graphics texture will be fixed and/or predefined.

The generated texture is in an embodiment stored, e.g. on an appropriate portable storage medium, such as a DVD, or in memory, for future use by a graphics processing pipeline, when it is desired to use the texture when rendering, e.g., an image.

In an embodiment, the texture is stored (encoded) as a set of mipmaps (i.e. where multiple versions of the original texture each having different levels of detail (resolution) are stored for use).

In one embodiment, a single graphics texture may be generated (and used) for the second object. This is particularly appropriate where, for example, the second object and/or the main viewpoint (camera) position for the scene will be "static", i.e. will not change with time.

However, in an embodiment, plural textures are generated for the second object.

In one such embodiment plural textures are in an embodiment generated for the second object for use when rendering the scene from plural different main viewpoint positions. In this embodiment, each of plural textures is in an embodiment generated so as to represent the second object from one of plural different main viewpoint (camera) positions for the scene, in an embodiment in the manner discussed above. In an embodiment one or more textures are generated for all possible different main viewpoint (camera) positions for the scene. This then facilitates the techniques of the technology described herein to be used for plural different main viewpoint (camera) positions for the scene (and in an embodiment for all possible different main viewpoint (camera) positions for the scene).

Such plural textures for an object may be generated and stored, e.g., as a suitable 3D (volume) texture.

Additionally or alternatively, plural textures may be generated for the second object that each represent the second object at different moments in time. This is in an embodiment done so as to allow the techniques of the technology described herein to be used when the second object changes with time (e.g. where the second object is a "dynamic" and/or animated object).

In an embodiment, the texture(s) may be generated in advance of its requirement, e.g. "offline" (rather than being generated in "real-time" as and when it is needed).

In this embodiment, where plural textures are generated in advance of their requirement, then in an embodiment when a texture is required for use (e.g. in the manner of the technology described herein as discussed above), a determination is made as to which of the plural textures should be used. This may be done, for example, based on the main viewpoint (camera) position for the scene and/or based on the current time for the scene (e.g. based on the current time for the animation of the second object).

Thus, in an embodiment, the method of the technology described herein further comprises determining (and the pipeline is configured to determine) which of plural (pre-generated) textures to use to determine the colour to be used to represent the part of the second object that will be visible through the first object, e.g., and in an embodiment, based on the current main viewpoint (camera) position for the scene and/or based on the current time for the scene. The so-determined texture is in an embodiment then used to determine the colour to be used to represent the part of the second object that will be visible through the first object in the manner of the technology described herein.

A particular advantage of these embodiments of the technology described herein is that because the texture(s) used to represent the second object can, in effect, be a "static" texture, it does not need to be generated in real-time, and can therefore, accordingly, be subjected to one or more non-real-time optimisations, if desired. Thus, in an embodiment, one or more of the texture(s) is subjected to one or more processing operations after it has been generated (and before it is stored for use), such as, and in an embodiment, one or more filtering processes, such as having one or more convolution filters applied to it. In an embodiment one or more of the texture(s) is subjected to one or more of: blurring; brightness processing; contrast processing (e.g. enhancement); sharpening, etc. In an embodiment, one or more of the texture(s) is subjected to one or more non-real-time optimisations.

In an embodiment, one or more of the texture(s) is also compressed before it is stored. Any suitable texture compression process can be used for this.

In an embodiment, plural textures may be generated and stored for one or more objects that it is anticipated may be displayed when executing the application, e.g. game, that the textures relate to. The textures can then be stored, e.g., with the remaining game data for use when the game is being executed.

In embodiments, the texture(s) can be generated in "real-time" (or "run-time"), e.g. as and when it is needed. This is particularly useful and appropriate where, for example, the second object is "dynamic", i.e. changes with time (e.g. is animated, etc.), and/or where the main viewpoint (camera) position changes with time. Real-time techniques, such as rendering-to-texture, are in an embodiment used to do this.

Thus, the method of the technology described herein in an embodiment further comprises (and the pipeline is in an embodiment configured to), when rendering the scene: generating the texture to be used to determine the colour to be used to represent the part of the second object that will be visible through the first object. The texture may be generated in the same (e.g. second) rendering frame or pass as it is to be used, or in another rendering frame or pass.

In an embodiment, the texture can be generated and/or updated periodically, e.g. once per frame or once per set of plural frames.

Additionally or alternatively, the texture can be generated and/or updated as and when it is needed. Thus, for example, the texture can be generated and/or updated as and when the second object changes and/or as and when the main viewpoint (camera) position changes, and/or as and when the benefits of not updating the texture are outweighed by the reduction in image quality, etc.

Accordingly, in an embodiment, when rendering the scene, a determination is made as to whether or not a (new) texture should be generated (and/or whether an existing texture should be updated), e.g., based on the main viewpoint (camera) position for the scene (e.g. depending on whether the position has changed) and/or based on the current time for the scene (e.g. based on the current time for the animation of the second object).

Thus, in an embodiment, the method of the technology described herein further comprises determining (and the pipeline is configured to determine) whether a (new) texture is required to be used to determine the colour to be used to represent the part of the second object that will be visible through the first object, in an embodiment based on the current main viewpoint (camera) position for the scene and/or the current time for the scene.

In an embodiment, when (if) it is determined that a (new) texture is required then a (new) texture is generated (and/or an existing texture is updated), in an embodiment in the manner as discussed above (i.e. by rendering an image of the second object from an auxiliary viewpoint position). The generated (and/or updated) texture is in an embodiment then used to determine the colour to be used to represent the part of the second object that will be visible through the first object in the manner of the technology described herein.

It will be appreciated that in these embodiments, generating and/or updating the texture less often than every frame will advantageously reduce the processing, memory and bandwidth requirements of the system.

In these embodiments, when the main viewpoint (camera) position changes, then in an embodiment the auxiliary viewpoint (camera) position (i.e. from which position the second object is in an embodiment rendered to generate the texture) also changes, in an embodiment such that it remains on the vector that terminates at the first and/or second object and that passes through the main viewpoint position, and in an embodiment such that the auxiliary camera remains facing the (centre of the) first and/or second object. In addition, the distance between the (centre of the) first and/or second object and the auxiliary viewpoint position in an embodiment does not change when this happens. As will be appreciated, this then means that the texture will always represent the second object effectively as seen from the main viewpoint position (absent the first object), and in an embodiment with a constant scale (size), such that it can be used appropriately in the manner of the technology described herein.

In an embodiment, the one or more textures are generated only when they will be required for use, e.g. in an embodiment only when the second object will be visible through the first object from the main viewpoint (camera) position. Thus, in an embodiment, a determination is made as to whether or not this will be the case. This may be done, for example, using an appropriately sized bounding volume (e.g. box or sphere) that surrounds the second object, e.g. to determine whether the bounding box or sphere falls within the main viewpoint (camera) view frustum. When (if) it is determined that the bounding box or sphere does not fall within the main viewpoint view frustum, then in an embodiment the generation of the texture is disabled. This determination may be made, e.g. every frame, or less than every frame, etc., as suitable and desired.

In other embodiments, the texture could also be generated so as to consider recursive refractions (as discussed above), e.g. by generating the texture in a recursive manner taking into account the effects of refraction by one or more second object(s), in an embodiment starting with the back-most object(s) and ending with the front-most object(s) (relative to the main viewpoint position).

Although the above embodiments have been described in terms of generating and using one or more two-dimensional textures that represent the second object, in other embodiments one or more three-dimensional textures may be generated and used. As will be appreciated, a single three-dimensional texture may be used to represent the second object from plural (all possible) different viewpoints.

The technology described herein can be used in and with any suitable and desired graphics processing system and pipeline.

The technology described herein is particularly suitable for use with tiled renderers (tile-based graphics processing systems). Thus, in an embodiment, the graphics processing pipeline is a tiled-based graphics processing pipeline.

The rasteriser of the graphics processing pipeline will generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent. These rendering processes may include, for example, fragment shading, blending, texture-mapping, etc. In an embodiment the renderer is in the form of or includes a programmable fragment shader.

The graphics processing pipeline may also contain any other suitable and desired processing stages that a graphics processing pipeline may contain such as an early depth (or an early depth and stencil) tester, a late depth (or depth and stencil) tester, a blender, a tile buffer or buffers, a write-out unit, etc.

The graphics processing pipeline in an embodiment also comprises, and/or is in communication with, one or more memories and/or memory devices that store the data described herein, such as the transparency-indicating textures, scene bounding volumes, etc., and/or that store software for performing the processes described herein. The graphics processing pipeline may also be in communication with the host microprocessor, and/or with a display for displaying images based on the data generated by the graphics processing pipeline.

The graphics processing pipeline in an embodiment includes at least local memory, such as (on-chip) buffer or buffers, and/or register(s), that can be used to store the data required for the texture sampling determination process and the determined texture values. Where present, the tile buffers can be used for this purpose, if desired. The graphics processing pipeline can in an embodiment also cache sampled texture values for future use, if desired.

The technology described herein can be used for all forms of output that a graphics processing pipeline may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or processing circuitry and/or programmable hardware elements and/or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the technology described herein. The graphics processing pipeline 1 is a tiled deferred renderer with a fully programmable GPGPU context, for example a renderer which executes partly via Direct Compute, OpenCL, CUDA, etc.

As the graphics processing pipeline 1 shown in FIG. 1 is a tile based renderer, it will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential. Each tile corresponds to a respective set of screen space sampling positions.)

The render output data array may typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation operations (not shown), vertex shading, interpolation and a primitive set up stage (not shown) to set up the primitives to be rendered, in response to the commands and vertex data provided to the graphics processor.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z buffer within the tile buffer 10. (The tile buffer will store colour and depth buffers that store appropriate colour, etc., values or a Z value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 that allow the effect of refraction in an image being rendered to be simulated in accordance with embodiments of the technology described herein will now be described.

The present embodiments operate to simulate the effect of refraction though an at least partially transparent object within a defined volume for a scene.

Figure 2:
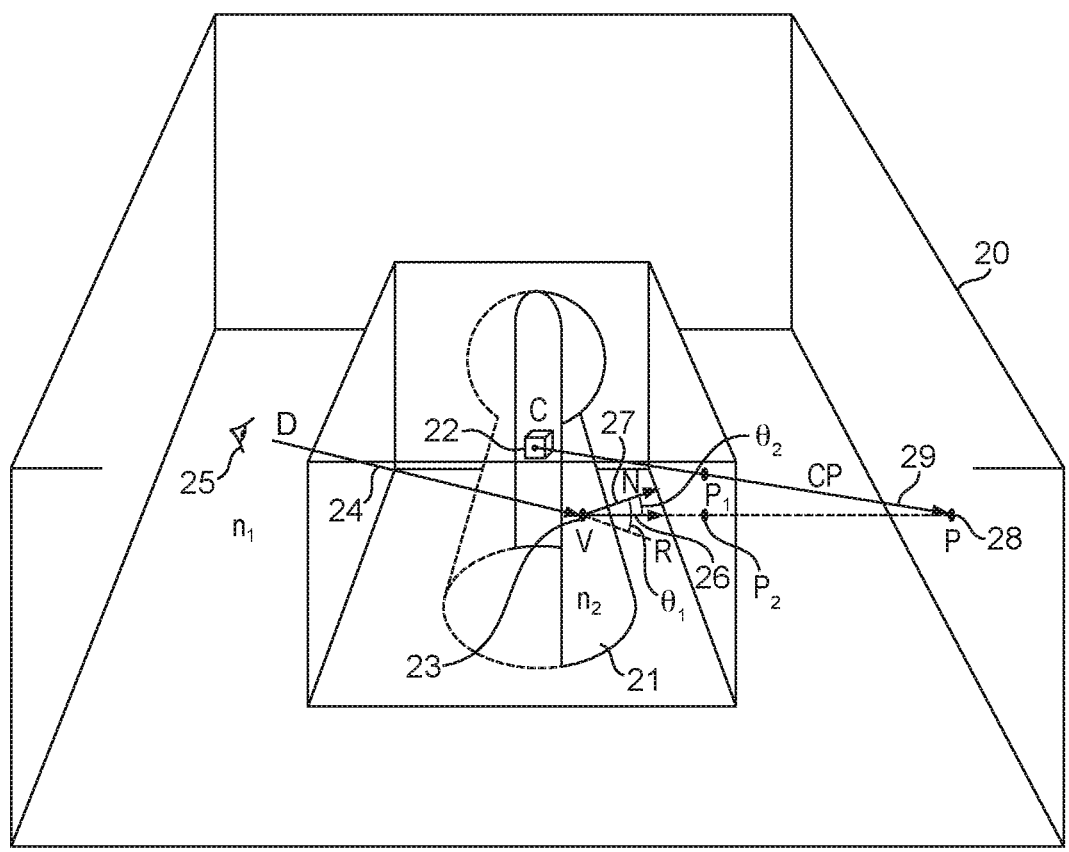
FIG. 2 shows schematically the operation of an embodiment of the technology described herein.

FIG. 2 illustrates this and shows an exemplary bounding volume 20 in the form of a bounding box that is defined in world space that represents a volume within the scene being rendered. In the present embodiment it is assumed that the bounding volume 20 corresponds to the entire scene and represents e.g., a room, but other arrangements would, of course, be possible.

As can be seen in FIG. 2, it is assumed that an at least partially transparent object 21 for which refraction is relevant is present in the scene. In the illustrated embodiment, the object 21 comprises a glass chess piece.

To facilitate the operation in the manner of the technology described herein, in the present embodiment a cube texture corresponding to the surface of the bounding volume 20 that stores at least RGB colour values representing the colour of the surface of the bounding volume 20 is generated.

This is done by rendering the scene excluding the object 21 to the cube texture from the reference position 22 (shown in FIG. 2) that the cube texture is to be defined with respect to. In the present embodiment, the reference position 22 is at the centre of the object 21. (The cube texture will be defined with respect to a reference position 22 (shown in FIG. 2) within the volume that the cube texture represents (thus the bounding volume for the scene), and will be sampled by determining the direction from that reference position that the sampled value (the sampled position) is required for.)

The cube texture is generated by rendering an image that will represent the surface of the bounding volume 20 from the viewpoint of the reference position 22 for the texture. To do this respective positions on the surface (the image representing the surface) for the scene are sampled for respective positions on the bounding volume (in the relevant direction from the reference position 22 for the texture). In this process, as the bounding volume will typically be an approximation of the actual scene and so may not match exactly to the surface of the scene (e.g. room) being defined, the points of the surface that are sampled for the texture (for each texel) do not need to fall exactly on the walls of the bounding volume 20 but can be on, outside of or inside the bounding volume. The output of this cube texture generation process is then a cube texture having RGB colour channels which represent the colour of the surface of the bounding volume for the scene that the cube texture relates to at respective positions on the surface of the bounding volume.

It would also be possible for the cube texture to store an alpha (transparency) channel, that can then be used to store other information for use for the rendering process. For example, the alpha channel could be used to indicate the transparency of the bounding volume 20, and/or to store other information relating, e.g., to a property or properties of the object itself or otherwise of the scene being rendered.

The additional information could indicate (encode) a region or regions of the at least partially transparent object for which refraction does not take place, such as one or more regions where one or more holes are present and/or where the object is fully opaque, and this information could be used to determine whether or not to apply the refraction effect. Additionally or alternatively, the additional information could indicate one or more areas of the bounding volume through which a far environment, such as sky, can be seen, and the information could be used to apply, e.g., a "skybox" texture in a convenient manner.

This additional data that is stored in the alpha channel can be generated at the same time as the RGB channels (i.e. in the same rendering pass) or using one or more additional passes, and with or without the at least partially transparent object being present (as appropriate).

For example, where the additional information indicates (encodes) a region or regions of the at least partially transparent object for which refraction does not take place, such as one or more regions where one or more holes are present and/or where the object is fully opaque, then the information could be generated by rendering the object from the inside, and then setting the alpha channel of each texel to 1 for regions where there is a surface and to 0 for regions where there is a hole (or vice versa).

Where the additional information indicates one or more areas of the bounding volume through which a far environment, such as sky, can be seen, then the addition information could be generated by performing an additional rendering pass without the at least partially transparent object being present, and then encoding the information in the alpha channel of the texture by combining the result of the additional rendering pass with the result of the (RGB) rendering pass(es).

Once the cube texture has been generated, it may optionally be subjected to various processing effects and optimisations, such as blurring, gamma correction, brightness and/or contrast enhancement, etc.

This optimisation processing is possible because the cube texture can be re-used whenever the scene in question is required, and where the scene is "static" (i.e. does not change with time) it does not need to be regenerated dynamically in use, and so non-real-time optimisations that would not be suitable for real-time generation of the cube texture can be used.

Furthermore, the generated (and if desired post-processed) cube texture can be compressed. Again this is possible because the cube texture does not need to be generated in real-time. Any suitable texture compression scheme can be used to compress the cube texture, such as for example, Adaptive Scalable Texture Compression (ASTC) (e.g. as described in GB 2491687), Ericsson Texture Compression (ETC), etc.

The cube texture generation and any post-processing/compression of the cube texture can be performed as desired and using any suitable processing system. In an embodiment the cube texture is generated "offline" and stored, and then provided to the graphics processing pipeline for use when it is required.

The use of the cube texture to determine the effect of refraction through the at least partially transparent object 21 within the scene will now be described with reference to FIGS. 2-8.

FIGS. 3-7 show schematically the main steps of the process.

The present embodiment operates to determine for respective sampling points on a surface of the object 21 being rendered, the colour to be used to represent the part of the scene that will be visible through the object at the sampling position using the cube texture. Essentially, as each primitive for the scene that is on the object 21 is rendered, for each sampling point of the primitive, the process shown schematically in FIG. 3 is performed to determine the colour to be used to represent the part of the refracted scene that will be visible through the object at the sampling position in question.

Figure 3:
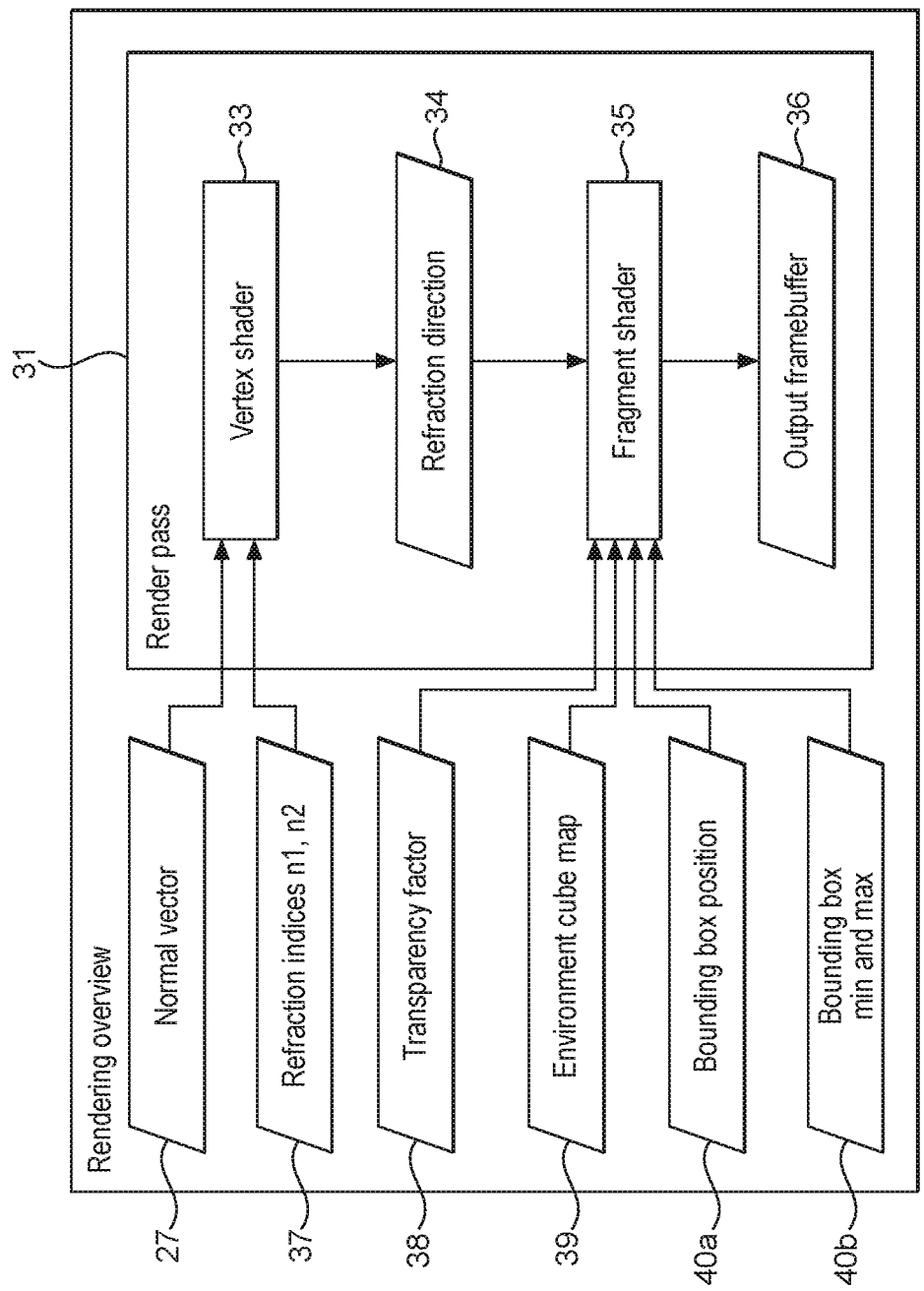
FIGS. 3, 4, 5, 6 and 7 illustrate the operation of an embodiment of the technology described herein.

Thus FIG. 3 shows the process for a given sampling point 23. This process is repeated for each sampling point that is to be processed in the manner of the present embodiment.

As shown in FIG. 3, the process of the present embodiment comprises a rendering pass 31.

The object 21 or part of the object 21 that is rendered in the rendering pass 31 is treated in the rendering pass 31 as being opaque (and not as being fully or partially transparent which it actually is). This then facilitates the use of the texture and ensures that the colour for the sampling position will be determined from the graphics texture and will not be subject to any blending with colour values from objects that may be behind the object but not actually visible at the sampling position in question due to the effects of refraction.

Figure 4:
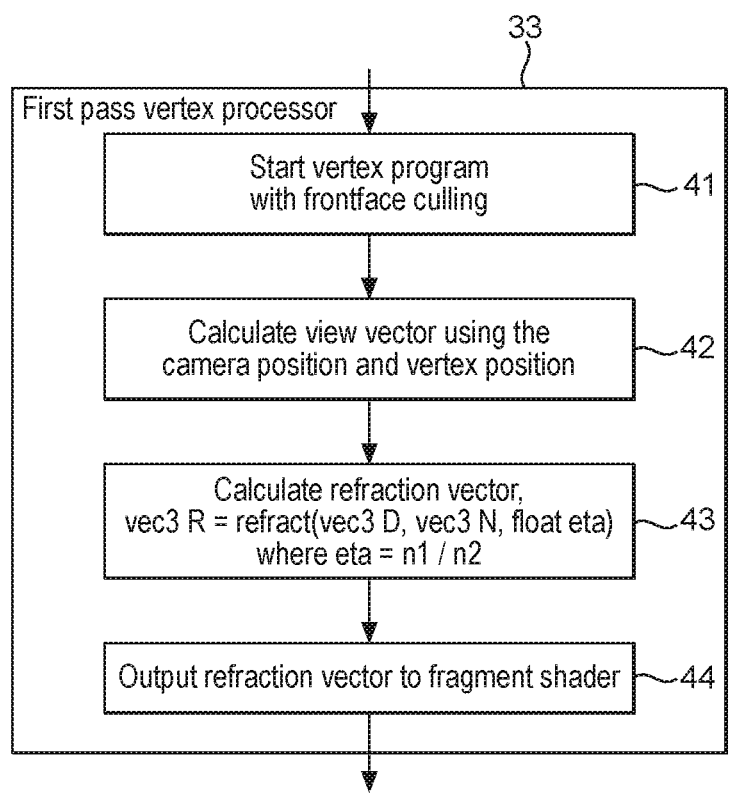

The process of the rendering pass 31 starts in the vertex shading stage of the fragment frontend operations 8 of the graphics processing pipeline (step 33). As shown in FIG. 4, the vertex shading program is started and front face culling is enabled (step 41). The view vectors from the viewpoint (camera) position 25 to the vertices of the primitive on which the sampling position 23 in question lies are then determined (step 42).

The effects of refraction on the view vector 24 from the viewpoint (camera) position 25 as the view vector passes through the surface of the object 21 at the sampling position 23 in question is then determined, that is, the refracted view vector 26 is determined (step 43).

Figure 8:
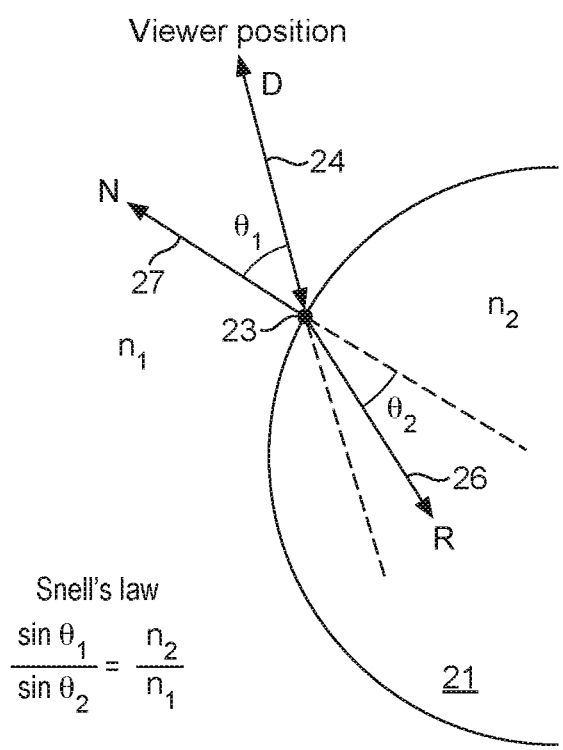
FIG. 8 illustrates schematically the effect of refraction at a surface.

In the present embodiment, this is done by determining the effects of refraction on each of the vertex view vectors as they pass through the surface of the object 21 to determine refracted vertex view vectors, and then interpolating those refracted vertex view vectors to derive the refracted view vector 26 for the sampling position in question. As shown in FIG. 8, the effect of refraction is to (potentially) alter the direction of the view vector 24 as it passes from the medium surrounding the object, which has a first refractive index $n_1$, to the object 21, which has a second, different refractive index $n_2$. This effect is described by Snell's law (as given above), from which the angle of refraction $\theta_2$ of the refracted view vector 26 measured from the normal 27 of the surface on which the sampling point 23 in question lies, can be calculated using the angle of incidence $\theta_1$ of the view vector 24 measured from the normal 27 of the surface, and the refractive indices of the object $n_2$ and the environment surrounding the object $n_1$.

Thus, the process of step 43 uses as its input the determined view vectors, the normal vector 27 of the surface (i.e. primitive) on which the sampling point 23 lies, and the refractive indices 37 of the object $n_2$ and the environment surrounding the object $n_1$. The refracted view vector 26 is then output to the fragment shader 6 (step 44).

Accordingly, the result of the vertex shader in the rendering pass 31 is the refracted view vector 26, which in the present embodiment is a normalised vector and so amounts to a refraction direction (step 34). The process is continued in the fragment shader (step 35).

Figure 5:
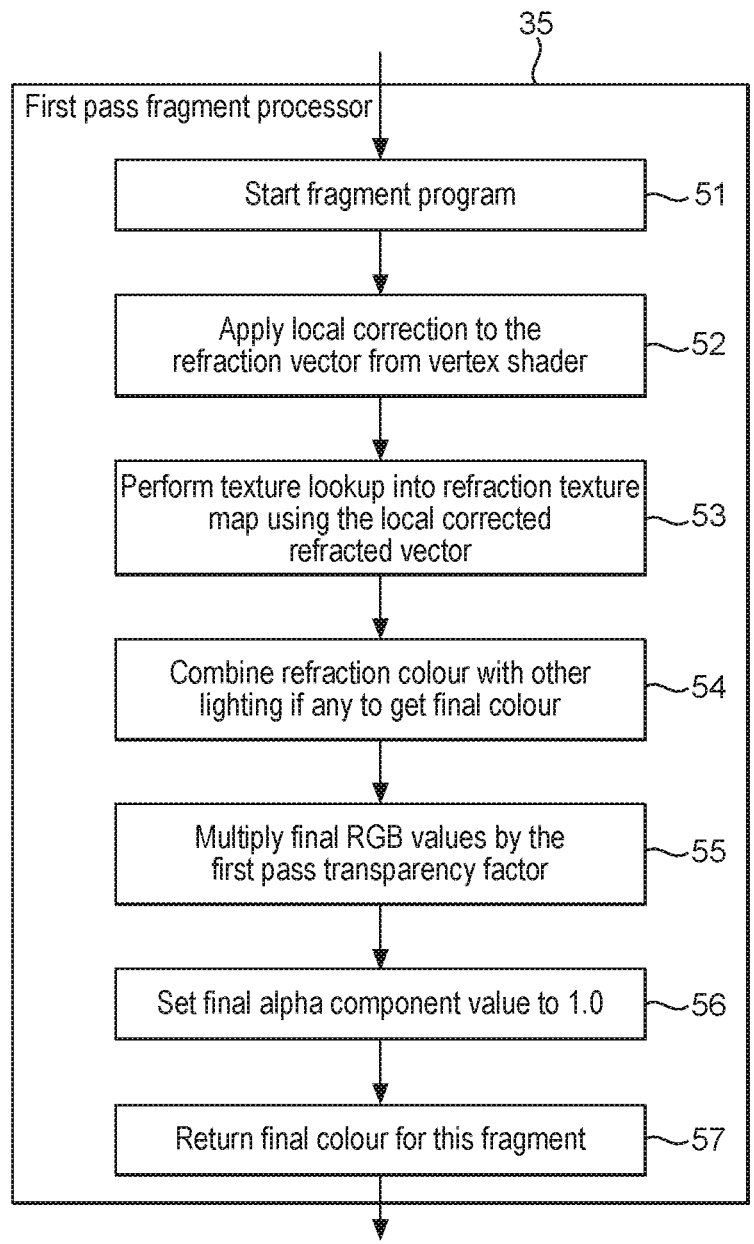

As shown in FIG. 5, after starting fragment shader program (step 51), the first step is to apply a "local correction" to the refracted view vector 26 to ensure that the correct position within the cube texture is sampled (step 52). This is required, because, as can be seen from FIG. 2, for example, the reference position 22 that the cube texture is sampled from (with respect to) may not (and typically will not) correspond to the sampling position 23 being considered, such that simply taking the refracted view vector 26 and using that to sample from the reference position 22 for the cube texture will not sample the correct part of the cube texture.

To apply this "local correction", as shown in FIG. 2, the intersection point 28 on the surface of the bounding volume 20 of the refracted view vector 26 is determined, and then the vector 29 from the reference position 22 that the cube texture is defined with respect to the intersection point 28 on the bounding volume 20 is determined, and that vector 29 is then used to sample the cube texture.

The cube texture is sampled at the position corresponding to the intersection position 28 to determine at least the colour (i.e. the RGB colour values) of the surface of the bounding volume 20 at that point (step 53). The cube texture can be sampled using any desired texture sampling (filtering) process, such as bilinear and/or tri-linear filtering (e.g. in the case where the cube texture is in the form of mipmaps). The filtering may, e.g., be provided by a texturing module (stage) of the graphics processing pipeline. This then gives a colour that is indicative of the part of the scene that will be visible through the object at the sampling position 23.

This output colour can then be used as desired (and as required), e.g. in an appropriate calculation, to determine the final output colour for the sampling position 23 in question.

In the illustrated embodiment, the sampled output colour can be optionally combined with the colour of the object 21 surface and/or one or more other colours from lighting calculations (step 54) sampled. The final colour value can optionally be controlled by multiplying the colour values by a transparency factor (step 55), e.g. to represent and control the visibility of the environment through the object 21. This transparency factor can be provided as desired, e.g. as a single value or as a set of values (e.g. in a texture).

As the geometry is rendered as being opaque, the output (final) alpha value for the sampling position in question is set to opaque ($\alpha=1$) (step 56). This then ensures that sampling position on the surface of the object will be treated as being opaque, e.g. if another object is rendered in front of it.

Where the cube texture stores additional information (e.g. in its alpha channel), such as transparency information, or other information or properties that relates to the scene being rendered, then that information should also be sampled and used as an appropriate input to control or affect the rendering process.

The final colour value (step 57) is then output to the frame buffer (tile buffer 10) (step 36).

As shown in FIG. 3, the inputs to the fragment shader operation (step 35) include the transparency factor 38 that is used in step 55, the environment cube map 39, and information 40 defining the bounding volume 20, including the bounding volume position 40a and its minimum and maximum extent 40b.

The above processes are repeated for the sampling points for all the primitives that are to be rendered (and then for the next frame (if appropriate), and so on).

In the present embodiment, a single rendering pass 31 of the form described above is used where the object comprises a "solid", non-hollow object.

Figure 6:
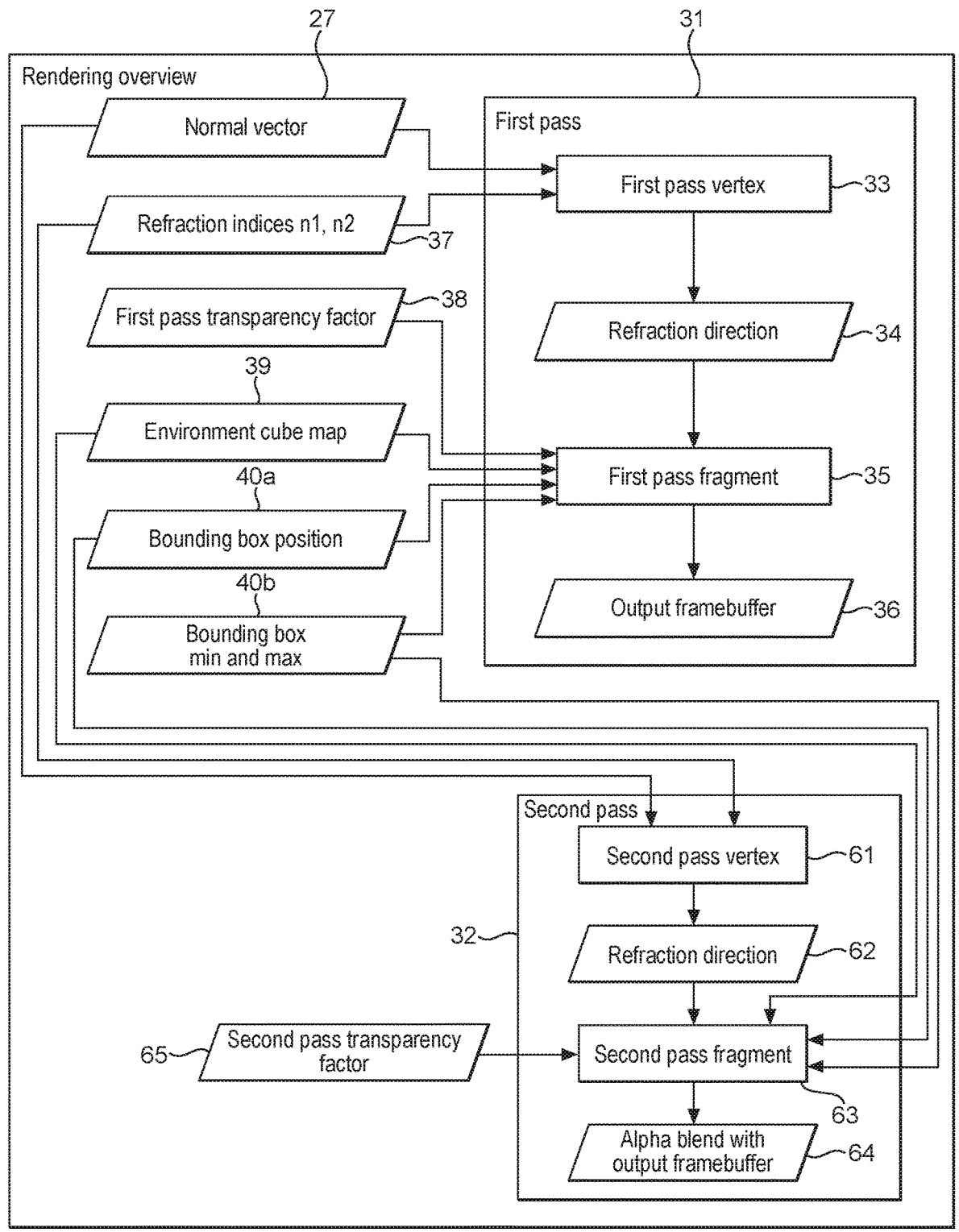

However, as shown in FIG. 6, an optional second rendering pass 32 may additionally be performed following the first rendering pass 31, if appropriate or desired.

In the present embodiment, a second rendering pass 32 is additionally used when rendering a hollow or concave object such as a glass, etc. In this case, only the back surface (or "back faces") of the object, i.e. the surface (primitives) of the object 21 that is furthermost from the viewpoint (camera) position 25 (e.g. the primitives that have their normals orientated away from the viewpoint position 25), is rendered in the first rendering pass 31 (as described above), and then only the front surface (or "front faces") (primitives) of the object 21 (e.g. the primitives that have their normals orientated towards the viewpoint position 25) is rendered in the second rendering pass 32.

In the second rendering pass 32, the front surface of the object may be rendered in a conventional manner, i.e. by treating the front surface as being partially transparent or transparent (as it is), with Z-writing off.

The results of the second rendering pass 32 are then alpha blended with the results of the first rendering pass 31 (step 64).

It will be appreciated that this represents a particularly convenient and efficient technique for rendering such "hollow" objects.

Other processes, would, of course, be possible. For example, the effects of refraction due to the change in refractive index at the front surface of the object may be fully taken into account in the second rendering pass 32.

As shown in FIG. 6, in the present embodiment this may be achieved by performing a second vertex shading pass 61 in order to determine a refraction direction 62 for the front surface of the object, e.g. in the manner of the first vertex shading pass 33, but with back face culling enabled. The process is continued in the fragment shader (step 63).

Figure 7:
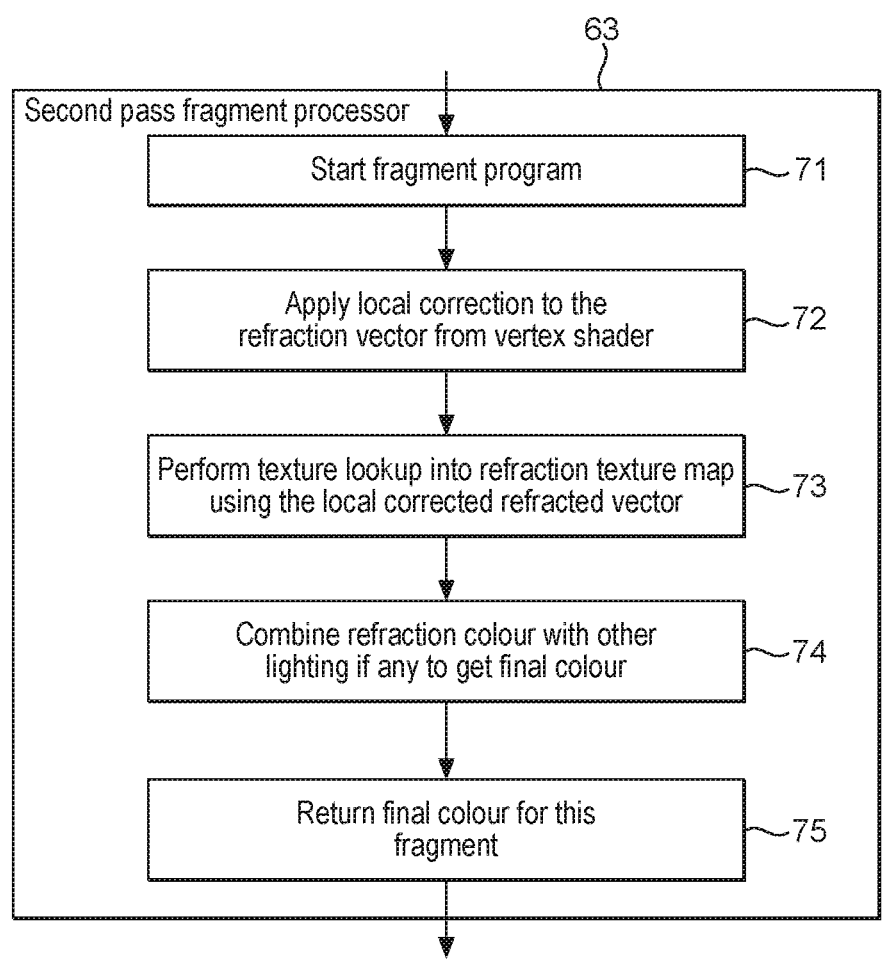

As shown in FIG. 7, after starting the fragment shader program (step 71), the first step is to apply a "local correction" to the refracted view vector to ensure that the correct position within the cube texture is sampled (step 72).

The cube texture is sampled to determine at least the colour (i.e. the RGB colour values) of the surface of the bounding volume 20 at that point (step 73). This output colour can then be used as desired (and as required), e.g. in an appropriate calculation, to determine the final output colour for the sampling position in question.

In the illustrated embodiment, the sampled output colour can be optionally combined with the colour of the object 21 surface and/or one or more other colours from lighting calculations (step 74).

As shown in FIG. 6, a second pass transparency factor 65 may also be defined and used in the second fragment shading pass 63 in a corresponding manner to the first pass transparency factor 38.

The final colour value is then output (step 75) and then alpha blended with the results of the first rendering pass 31 (step 64).

Various modifications, additions and alternatives to the above-described embodiments of the technology described herein would be possible, if desired.

In an embodiment, the colour indicating textures (thus the cube texture) are stored in the form of mipmaps (i.e. where multiple versions of the original texture data array, each having different levels of detail (resolution), are stored for use). In this case, each lower resolution mipmap level is in an embodiment a downscaled (in an embodiment by a factor of 2) representation of the previous higher resolution mipmap level.

In this case, the texture sampling process in an embodiment also determines which mipmap level or levels (the level of detail) to sample the colour indicating texture at. The mipmap level(s) (level of detail) to use is in an embodiment selected based on the distance from the sampling point being considered to the intersection position on the bounding volume of the refracted view vector. Other arrangements would, of course, be possible.

Although the above embodiment has been described with reference to the use of a "static" texture map (cube texture), in various further embodiments, the texture map may be "dynamic", i.e. it may be changed with time. This is particularly useful and appropriate where the environment surrounding the object is "dynamic", i.e. changes with time (there may be, for example, other objects moving in the scene, etc.) (and conversely where the environment surrounding the object is static, then the use of a static texture map may be preferable.)

In the present embodiment, the texture can be generated and/or updated in real time by rendering-to-texture.

The texture can be generated and/or updated periodically, e.g. once per frame or once per set of plural frames, or as and when it is needed. Thus, for example, the texture can be generated and/or updated as and when the environment surrounding the object changes, and/or as and when the benefits of not updating the texture are outweighed by the reduction in image quality, etc.

Similarly, the entire texture can be generated and/or updated in real-time, or only part (some but not all) of the texture can be generated and/or updated in real-time. For example, each face of the texture can be separately generated and/or updated in real-time (for example, one face of the texture could be updated per frame or per set of plural frames).

Generating and/or updating the texture less often than every frame and/or generating and/or updating less than all of the texture will advantageously reduce the processing, memory and bandwidth requirements of the system.

In various embodiments, relatively more complex effects of refraction can be taken account of when determining the refracted view vector.

Thus, for example, where the at least partially transparent object has a non-uniform refractive index, the determination of the refracted view vector from the view vector may comprise more complex calculations, that e.g. consider the path of the view vector as it passes through the regions of different refractive indices, if desired.

The effects of a changing or moving medium (such as, e.g., flowing water) within the at least partially transparent object may be (approximately) taken into account by animating the refracted view vector. The properties of the animation may be selected as desired to, e.g., represent the changes in the medium with time. This represents a particularly simple and efficient technique for rendering such media, e.g. in which it is not necessary to directly determine the effects of the changes in the medium on the refracted view vector.

The effects of chromatic aberration can be taken into account by, e.g., determining plural (slightly) different refracted view vectors (e.g. one per RGB colour channel of the texture), and using each of the refracted view vectors to sample the texture for each of the colour channels.

As can be seen from the above, the technology described herein, in its embodiments at least, provides an effective, and bandwidth efficient, mechanism for simulating "real-world" physical effects of refraction, that, in contrast to existing techniques, can use a "static" texture map for determining the effect of refraction, rather than having to use (and constantly regenerate) "dynamic" texture maps for that purpose. This then allows higher quality physically based effects to be achieved in a bandwidth and processing efficient manner.

This is achieved, in embodiments of the technology described herein at least, by defining a texture map that indicates the colour of the surface of a bounding volume within a scene to be rendered, treating at least some of a transparent object as opaque, and then sampling the texture map to determine a colour to be used to represent the parts of the refracted scene that will be visible through the object at sampling positions on the surface of the object.

The above embodiments describe methods to simulate the effect of refraction, e.g. of the environment, though an at least partially transparent object within a defined volume for a scene.

Further embodiments that operate to simulate the effect of refraction though a or the at least partially transparent first object within the scene, where a second object is present inside of the first object will now be described in relation to FIGS. 9-13.

These further embodiments may be used in combination with the above embodiments. Thus, for example, the techniques described above in relation to FIGS. 2-8 may be used to take into account the effects of refraction of the surrounding environment as seen through an at least partially transparent "first" object, while these further embodiments may be used to take into account the effects of refraction of at least one "second" object as seen through a or the at least partially transparent first object, where the second object is at least partially behind and/or at least partially within the a or the first object.

Figure 9:
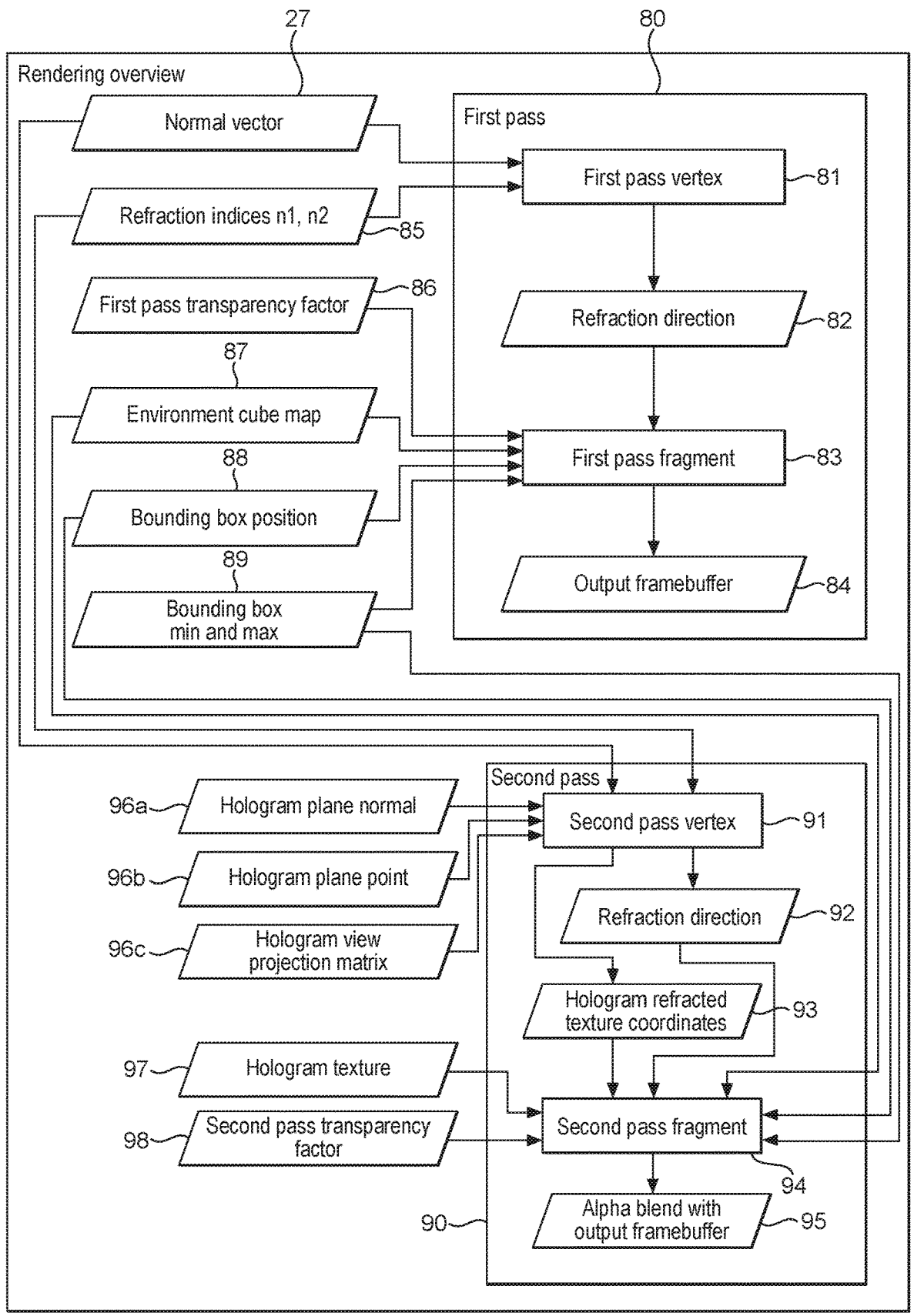
FIGS. 9-13 show schematically the operation of embodiments of the technology described herein.

FIG. 9 shows schematically the main steps of the process of these further embodiments.

As shown in FIG. 9, the process of the present embodiment comprises a first rendering pass 80, followed by a second rendering pass 90. In the present embodiment, the first rendering pass 80 is performed in order to simulate the effect of refraction through the back surface (or "back faces") of the at least partially transparent first object, i.e. the surface (primitives) of the first object that is furthermost from the main viewpoint (camera) position for the scene (e.g. the primitives that have their normals orientated away from the viewpoint position), and the second rendering pass 90 is performed in order to simulate the effect of refraction through the front surface (or "front faces") (primitives) of the first object, i.e. the surface of the first object that is nearest to the main viewpoint position for the scene (e.g. the primitives that have their normals orientated towards the viewpoint position).

Accordingly, the first rendering pass 80 considers the effects of the refraction between the surrounding environment and the back surface of the first object (e.g. without considering the second object), and the second rendering pass 90 considers the effects of refraction between the front surface of the first object and the environment (and must therefore consider the second object).

FIGS. 2, 4 and 5 illustrate the process in the first rendering pass 80.

As shown in FIG. 2, in the present embodiment a bounding volume 20 in the form of a bounding box is defined in world space that represents a volume within the scene being rendered. In the present embodiment it is assumed that the bounding volume 20 corresponds to the entire scene and represents e.g., a room, but other arrangements would, of course, be possible.

As can be seen in FIG. 2, an at least partially transparent first object 21 is present in the scene. In the illustrated embodiment, the first object 21 comprises a glass chess piece. In the present embodiment, a second object is present inside the first object 21, but this is not considered in the first rendering pass and so is not shown in FIG. 2.

In the present embodiment a cube texture corresponding to the surface of the bounding volume 20 that stores at least RGB colour values representing the colour of the surface of the bounding volume 20 is generated.

This is done by rendering the scene excluding the first 21 and second objects to the cube texture from the reference position 22 (shown in FIG. 2) that the cube texture is to be defined with respect to. In the present embodiment, the reference position 22 is at the centre of the first object 21. (The cube texture will be defined with respect to a reference position 22 (shown in FIG. 2) within the volume that the cube texture represents (thus the bounding volume for the scene), and will be sampled by determining the direction from that reference position that the sampled value (the sampled position) is required for.)

The cube texture is generated by rendering an image that will represent the surface of the bounding volume 20 from the viewpoint of the reference position 22 for the texture. To do this respective positions on the surface (the image representing the surface) for the scene are sampled for respective positions on the bounding volume (in the relevant direction from the reference position 22 for the texture). In this process, as the bounding volume will typically be an approximation of the actual scene and so may not match exactly to the surface of the scene (e.g. room) being defined, the points of the surface that are sampled for the texture (for each texel) do not need to fall exactly on the walls of the bounding volume 20 but can be on, outside of or inside the bounding volume. The output of this cube texture generation process is then a cube texture having RGB colour channels which represent the colour of the surface of the bounding volume for the scene that the cube texture relates to at respective positions on the surface of the bounding volume.

It would also be possible for the cube texture to store an alpha (transparency) channel, that can then be used to store other information for use for the rendering process. For example, the alpha channel could be used to indicate the transparency of the bounding volume 20, and/or to store other information relating, e.g., to a property or properties of the object itself or otherwise of the scene being rendered. This additional data that is stored in the alpha channel can be generated at the same time as the RGB channels (i.e. in the same rendering pass) or using one or more additional passes, and with or without the at least partially transparent object being present (as appropriate).

Once the cube texture has been generated, it may optionally be subjected to various processing effects and optimisations, such as blurring, gamma correction, brightness and/or contrast enhancement, etc.

This optimisation processing is possible because the cube texture can be re-used whenever the scene in question is required, and where the scene is "static" (i.e. does not change with time) it does not need to be regenerated dynamically in use, and so non-real-time optimisations that would not be suitable for real-time generation of the cube texture can be used.

Furthermore, the generated (and if desired post-processed) cube texture can be compressed. Again this is possible because the cube texture does not need to be generated in real-time. Any suitable texture compression scheme can be used to compress the cube texture, such as for example, Adaptive Scalable Texture Compression (ASTC) (e.g. as described in GB 2491687), Ericsson Texture Compression (ETC), etc.

The cube texture generation and any post-processing/compression of the cube texture can be performed as desired and using any suitable processing system. In an embodiment the cube texture is generated "offline" and stored, and then provided to the graphics processing pipeline for use when it is required.

The use of the cube texture in the first rendering pass to determine the effect of refraction through the back surface of the at least partially transparent first object 21 within the scene will now be described.

FIGS. 4 and 5 show schematically the main steps of the process.

The present embodiment operates to determine in the first rendering pass 120 for respective sampling points on the back surface of the first object 21 being rendered, the colour to be used to represent the part of the scene that will be visible through the object at the sampling position using the cube texture. Essentially, as each primitive for the scene that is on the back surface of the first object 21 is rendered, for each sampling point of the primitive, the process shown schematically in FIGS. 4 and 5 is performed to determine the colour to be used to represent the part of the refracted scene that will be visible through the object at the sampling position in question.

Thus FIGS. 4 and 5 shows the process for a given sampling point 23. This process is repeated for each sampling point that is to be processed in the manner of the present embodiment.

The back surface of the first object 21 that is rendered in the first rendering pass 120 is treated in the first rendering pass 120 as being opaque (and not as being fully or partially transparent which it actually is). This then facilitates the use of the texture and ensures that the colour for the sampling position will be determined from the graphics texture and will not be subject to any blending with colour values from objects that may be behind the object but not actually visible at the sampling position in question due to the effects of refraction.

The process of the first rendering pass 80 starts in the vertex shading stage of the fragment frontend operations 8 of the graphics processing pipeline (step 81). As shown in FIG. 4, the vertex shading program is started and front face culling is enabled (step 41). The view vectors from the viewpoint (camera) position 25 to the vertices of the primitive on which the sampling position 23 in question lies are then determined (step 42).

The effects of refraction on the view vector 24 from the viewpoint (camera) position 25 as the view vector passes through the surface of the object 21 at the sampling position 23 in question is then determined, that is, the refracted view vector 26 is determined (step 43).

In the present embodiment, this is done by determining the effects of refraction on each of the vertex view vectors as they pass through the surface of the object 21 to determine refracted vertex view vectors, and then interpolating those refracted vertex view vectors to derive the refracted view vector 26 for the sampling position in question.

As shown in FIG. 8, the effect of refraction is to (potentially) alter the direction of the view vector 24 as it passes between the medium surrounding the object, which has a first refractive index $n_1$, and the object 21, which has a second, different refractive index $n_2$. This effect is described by Snell's law (as given above), from which the angle of refraction $\theta_2$ of the refracted view vector 26 measured from the normal 27 of the surface on which the sampling point 23 in question lies, can be calculated using the angle of incidence $\theta_1$ of the view vector 24 measured from the normal 27 of the surface, and the refractive indices of the object $n_2$ and the environment surrounding the object $n_1$.

Thus, the process of step 43 uses as its input the determined view vectors, the normal vector 27 of the surface (i.e. primitive) on which the sampling point 23 lies, and the refractive indices 85 of the object $n_2$ and the environment surrounding the object $n_1$. The refracted view vector 26 is then output to the fragment shader 6 (step 44).

Accordingly, the result of the vertex shader in the first pass 80 is the refracted view vector 26, which in the present embodiment is a normalised vector and so amounts to a refraction direction (step 82). The process is continued in the fragment shader (step 83).

As shown in FIG. 5, after starting fragment shader program (step 51), the first step is to apply a "local correction" to the refracted view vector 26 to ensure that the correct position within the cube texture is sampled (step 52). This is required, because, as can be seen from FIG. 2, for example, the reference position 22 that the cube texture is sampled from (with respect to) may not (and typically will not) correspond to the sampling position 23 being considered, such that simply taking the refracted view vector 26 and using that to sample from the reference position 22 for the cube texture will not sample the correct part of the cube texture.

To apply this "local correction", as shown in FIG. 2, the intersection point 28 on the surface of the bounding volume 20 of the refracted view vector 26 is determined, and then the vector 29 from the reference position 22 that the cube texture is defined with respect to the intersection point 28 on the bounding volume 20 is determined, and that vector 29 is then used to sample the cube texture.

The cube texture is sampled at the position corresponding to the intersection position 28 to determine at least the colour (i.e. the RGB colour values) of the surface of the bounding volume 20 at that point (step 53). The cube texture can be sampled using any desired texture sampling (filtering) process, such as bilinear and/or tri-linear filtering (e.g. in the case where the cube texture is in the form of mipmaps). The filtering may, e.g., be provided by a texturing module (stage) of the graphics processing pipeline. This then gives a colour that is indicative of the part of the scene that will be visible through the back surface of the first object 21 at the sampling position 23. This output colour can then be used as desired (and as required), e.g. in an appropriate calculation, to determine the output colour for the sampling position 23 in question.

In the illustrated embodiment, the sampled output colour can be optionally combined with the colour of the object 21 surface and/or one or more other colours from lighting calculations (step 54). The colour value can optionally be controlled by multiplying the colour values by a transparency factor (step 55), e.g. to represent and control the visibility of the environment through the object 21. This transparency factor can be provided as desired, e.g. as a single value or as a set of values (e.g. in a texture).

As the back surface of the first object 21 is rendered as being opaque, the output alpha value for the sampling position in question is set to opaque ($\alpha=1$) (step 56). This then ensures that sampling position on the back surface of the object 21 will be treated as being opaque, e.g. in the further stages of the process.

Where the cube texture stores additional information (e.g. in its alpha channel), such as transparency information, or other information relating to the scene, then that information should also be sampled and used as an appropriate input to control or affect the rendering process.

The final colour value for the first rendering pass (step 57) is then output to the frame buffer (tile buffer 10) (step 84).

As shown in FIG. 9, the inputs to the fragment shader operation (step 83) include the transparency factor 86 that is used in step 55, the environment cube map 87, and information defining the bounding volume 20, including the bounding volume position 88 and its minimum and maximum extent 89.

The above processes are repeated for the sampling points for all the primitives that are to be rendered (and then for the next frame (if appropriate), and so on).

As shown in FIG. 9, the second rendering pass 90, in which the front surface of the first object 21 is rendered, is performed following the first rendering pass 80.

FIGS. 10, 11, 12 and 13 illustrate the process in the second rendering pass 30.

Figure 10:
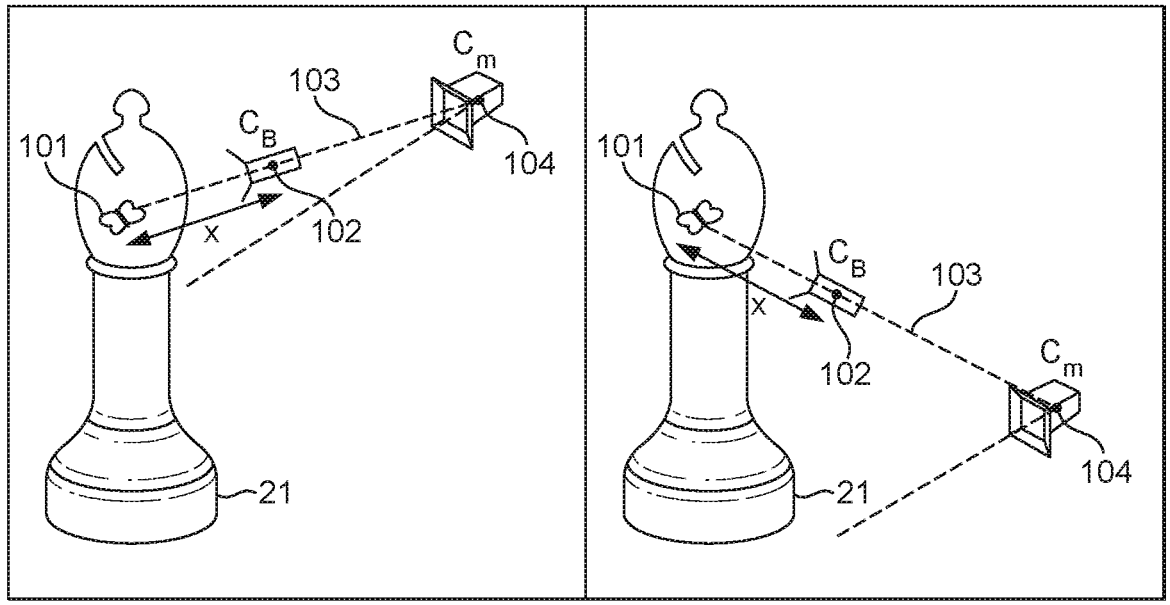
Figure 11:
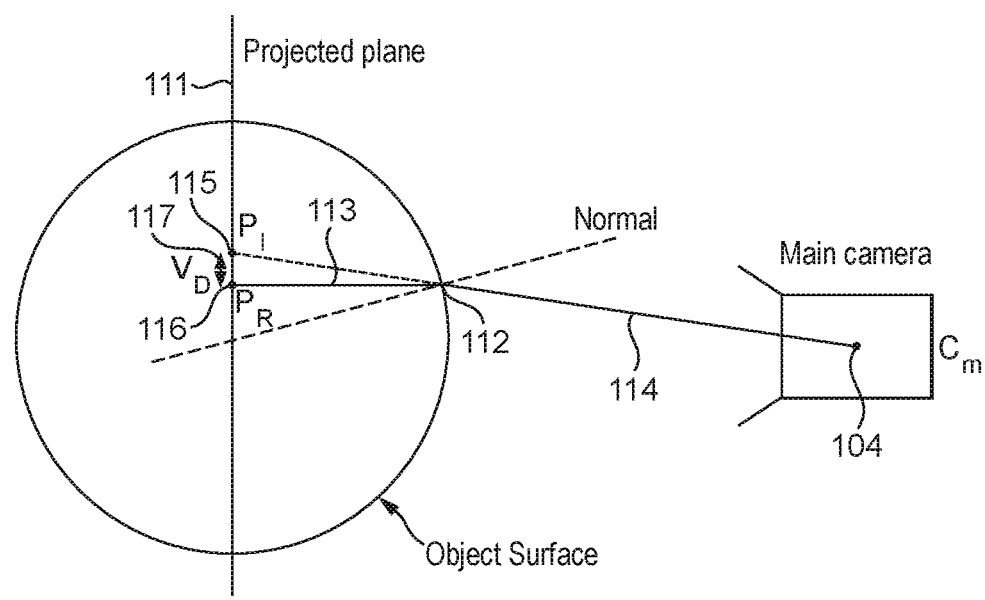

As can be seen in FIG. 10, in the present embodiment, a second object 101 is present inside the at least partially transparent first object 21. In the illustrated embodiment, the second object 101 is an animated butterfly.

The present embodiment operates to determine in the second rendering pass 90 for respective sampling points on the front surface of the first object 21 (relative to the main viewpoint position 104 for the scene) being rendered, the colour to be used to represent the part of the second object 101 that will be visible through the first object 21 at the sampling position using a texture that represents the second object.

In order to do this, one or more two-dimensional textures that store RGB colour values representing the colour of the second object 101 are generated. The texture(s) may also store an alpha (transparency) value channel whose values correspond to the transparency of the second object 101 or some other information, if desired.

In the present embodiment, the one or more textures are generated in "real-time" (i.e. at "run-time") using rendering-to-texture either periodically, e.g. once per frame or once per set of plural frames, or as and when needed. The one or more textures can be generated or updated as and when the second object 101 changes or as and when the main viewpoint (camera) position 104 changes, and/or as and when the benefits of not updating the texture are outweighed by the reduction in image quality, etc.

As shown in FIG. 10, each texture is generated by rendering an image of the second object 101 to a texture from an auxiliary viewpoint position 102, with the "auxiliary camera" $C_B$ used to do this directly facing the second object 101. This rendering operation excludes the first object 21 and any other objects, e.g. by appropriately masking the view of the auxiliary camera $C_B$.

The auxiliary viewpoint position 102 is located at a position on a vector 103 that terminates (starts or ends) at the centre of the first object 21 and that passes through the main viewpoint position 104 for the scene. As can be seen in FIG. 10, when the main viewpoint position 104 for the scene changes, then the auxiliary viewpoint position 102 also changes such that it remains on the vector 103 that terminates at the first object 21 and that passes through the main viewpoint position 104, and such that the auxiliary camera $C_B$ remains facing the centre of the first object 21 (regardless of the position or orientation of the main camera $C_M$). The distance x between the centre of the first object 21 and the auxiliary viewpoint position 102 also remains at a fixed, predefined distance. The fixed, predefined distance x can be altered to scale the size of the second object 101.

As will be appreciated, this then means that the generated texture will always represent the second object 101 effectively as seen from the main viewpoint position 104 absent the first object 21, and at a constant and predefined scale. The texture will change depending on the main viewpoint position 104, and so will effectively represent the second object 101 in three dimensions. The texture can therefore be considered as being a "hologram texture".

Although in an embodiment the vector 103 terminates (starts or ends) at the centre of the first object 21 (and this will be particularly appropriate, e.g. where the second object is behind the first object and/or is moving or may move behind the first object and/or where the graphics texture represents plural second objects), it could also terminate at any arbitrary point in the first object 41 as desired, or indeed within the second object 101. In one embodiment, the vector terminates at the second object where the second object is inside of the first object and/or where the graphics texture represents only a single second object. Moreover, the vector 103 need not terminate inside the first or second object, e.g.

where the object comprises a concave or other object. Thus, the vector 103 could also be defined to terminate at the bounding box of the object.

In the present embodiment, the one or more textures representing the second objection 101 are generated only when they will be required for use, e.g. only when the second object will be visible through the first object from the main viewpoint (camera) position. An appropriately sized bounding box or sphere that surrounds the second object may be used to determine whether the bounding box or sphere for the second object falls within the main viewpoint (camera) view frustum, with the generation of the texture then being enabled or disabled as appropriate. This determination may be made, e.g. every frame, or less than every frame, etc.

It would also be possible to generate one or more textures representing the second object 101 in advance of their requirement, e.g. "offline" (rather than being generated in "real-time" as and when it is needed). Plural such textures could be generated, that each represent the second object 101 from plural different possible main viewpoint positions and/or at different times in an animation sequence. It could then be determined which of the plural textures should be used when rendering the scene, e.g. based on the main viewpoint position 104 for the scene and/or based on the current time for the scene, etc.

Alternatively one or more three-dimensional textures that represent the one or more second object(s) could be generated and used. A single three-dimensional texture could be used to represent the second object from plural (e.g. all possible) different viewpoints.

Once the texture that represents the second object 101 has been generated (or determined), then it is used in the second rendering pass 90.

Figure 12:
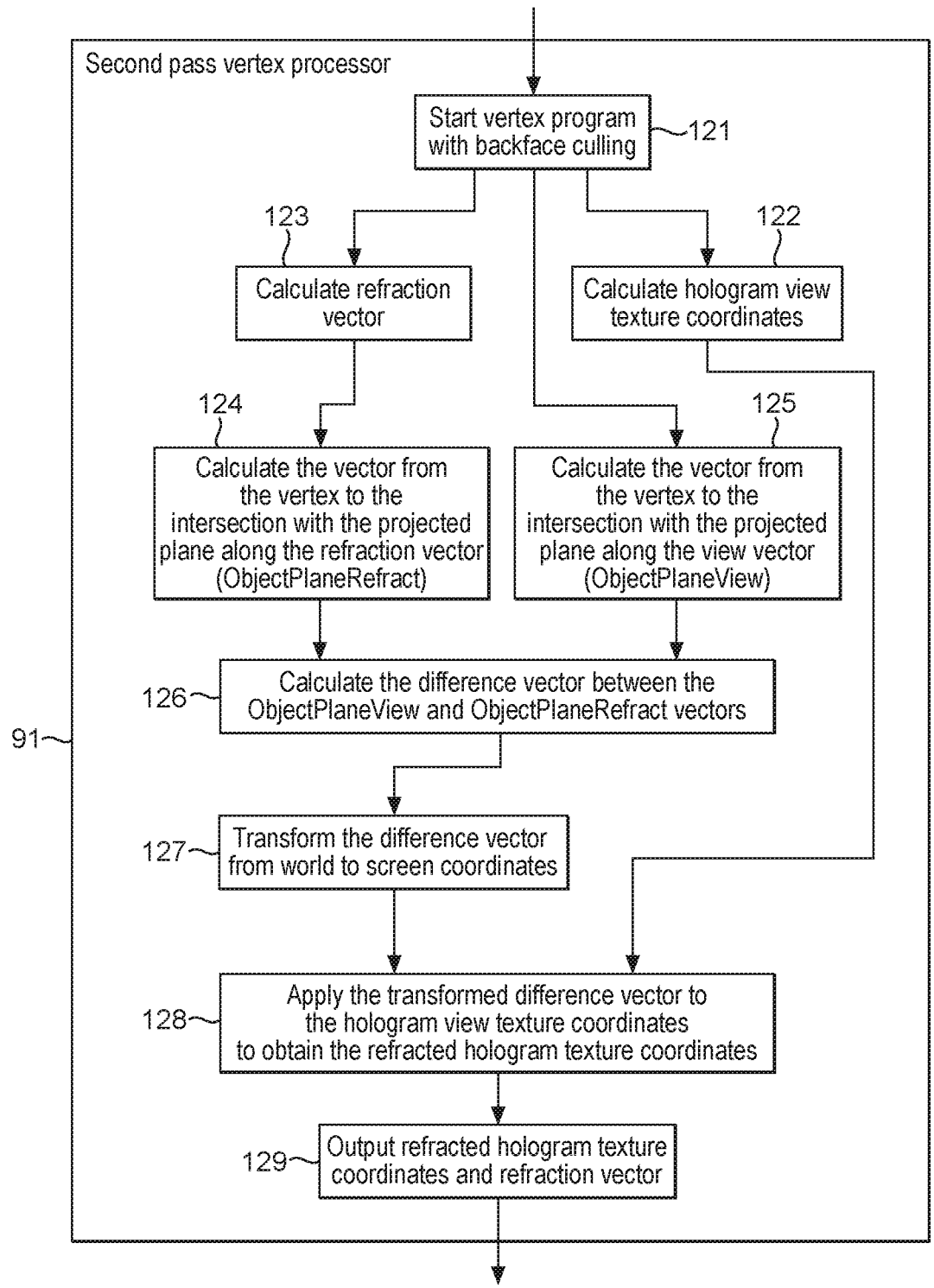
Figure 13:
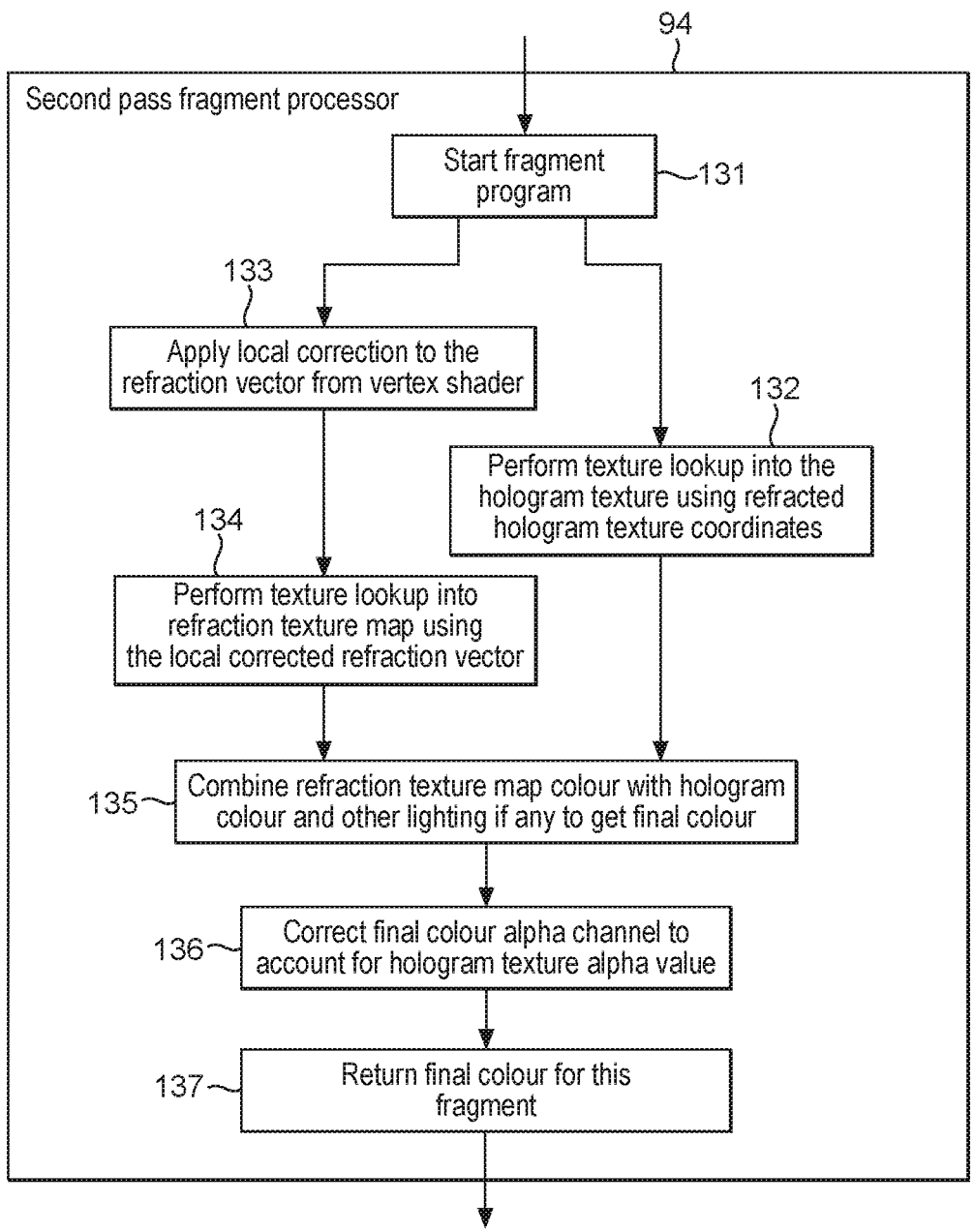

FIGS. 12 and 13 show the main steps of the second rendering pass 80. Essentially, as each primitive for the scene that is on the front surface of the first object 21 is rendered, for each sampling point of the primitive, the process shown schematically in FIGS. 12 and 13 is performed to determine the colour to be used to represent the part of the second object that will be visible through the first object 21 at the sampling position in question.

Thus FIGS. 12 and 13 shows the process for a given sampling point. This process is repeated for each sampling point that is to be processed in the manner of the present embodiment.

In the second rendering pass 90, the front surface is treated as being partially transparent or transparent (as it is), with Z-writing off.

The process of the second rendering pass 90 starts in the vertex shading stage of the fragment frontend operations 8 of the graphics processing pipeline (step 91). The vertex shading program is started and back face culling is enabled (step 121).

For each sampling position being considered, appropriate "un-modified" texture coordinates for the texture that represents the second object 101 are determined (step 122).

This is done by mapping the graphics texture that represents the second object 101 onto the front surface of the first object 21 as if the texture was projected onto a plane at the first object (i.e. using projective texture mapping), and then determining the appropriate (un-modified) texture coordinates for each sampling position. The projection plane 111 is orthogonal to the vector 103 between the first object 101 and the main viewpoint position 104, and is located inside the first object 21 at the centre of the first object 21. It would also be possible to locate the projection plane at the (centre of the) second object and/or to move the projection plane 111 to be relatively closer to or further away from the main viewpoint (camera) position 104, to, e.g., effectively exaggerate or reduce the refraction effect.

For each sampling point 112 on the surface of the first object 21, a refracted view vector 113 is calculated (step 123). This is done by firstly determining the view vectors from the viewpoint (camera) position 104 to the vertices of the primitive on which the sampling position 112 in question, then determining the effects of refraction on the view vectors as the view vectors pass through the surface of the object 21, and then interpolating the refracted vertex view vectors to arrive at the refracted view vector 114 for the sampling position (e.g. in a corresponding manner to that discussed above).

Next, the vectors between the sampling point 112 and the projected plane 111 along the view vector 114 and the refracted view vector 113 are determined (steps 124 and 125). The position 115 on the projection plane 111 intersected by the view vector 114, and the position 116 on the projection plane 111 intersected by the refracted view vector 113 are then used to determine a difference vector 117 (i.e. the vector 117 between the view vector intersection point 115 and the refracted view vector intersection point 116 in world space) (step 126).

The difference vector 117 is then transformed from world space into the space in which the texture is defined (step 127), and then the texture space definition of the difference vector is used to modify the un-modified texture coordinates to obtain the texture coordinates to be used to sample the texture representing the second object 101 for the sampling position 112 in question (step 128).

These texture coordinates are then output by the vertex shading stage (step 129), and used as an input to the fragment shader (step 93). The direction of the refracted view vector may also be output by the vertex shading stage (step 92).

As shown in FIG. 9, the inputs to the second vertex shading pass 91 include the normal of the projection plane 96a, its location 96b, and the matrix 96c that is used to transform between world space and the space in which the texture is defined.

The process is continued in the fragment shader (step 94).

As shown in FIG. 13, after starting the fragment shader program (step 131), the first step is to perform a texture look into the generated "hologram" texture using the (modified) texture coordinates determined by the vertex shading stage, i.e. to determine the colour to be used for the second object 101 at the sampling point in question (step 132). The determined colour is then used (in step 135) to determine the "final" colour for the sampling point in question (for the second rendering pass 90), by optionally combining the colour with one or more other colours determined for the sampling point (e.g. from lighting effects, etc.).

As shown in FIG. 13, for each sampling point, a colour contribution from the background may optionally be determined by using the cubemap for the scene that was used in the first rendering pass 80. This involves applying the local correction to the refracted view vector 113 that was output by the vertex shading stage (step 133), and then using the locally corrected vector to perform a lookup into the cubemap (step 134), i.e. the manner as discussed above. The colour contribution determined in this way can then be combined with the other colours in step 135, e.g. by alpha blending using the appropriate alpha values for each colour.

The alpha channel for the "final" colour can optionally be modified (in step 136) to account for the alpha value of the "hologram texture", before being output (step 137). This can be used to account for the fact that the hologram texture should become more visible the more transparent the first object becomes, and vice versa.

As shown in FIG. 9, the inputs to the second fragment shading pass 94 include the "hologram texture" 97 (the texture representing the second object 101) and a transparency factor 98.

The results of the second rendering pass 90 are then alpha blended with the results of the first rendering pass 80 stored in the frame buffer so as to arrive at the final colour to be used for the sampling position in question (step 95). The alpha factors used to blend the results can be controlled as desired.

As will be appreciated, this colour will appropriately take into account the front surface of the first object 21, the second object 101, the back surface of the first object 21, and the surrounding environment, with the effects of refraction also considered. This represents a particularly convenient and efficient technique for rendering an at least partially transparent object that has another object inside of it.

Various modifications, additions and alternatives to the above-described embodiments of the technology described herein would be possible, if desired.

In one embodiment, the second object may be behind the first object (and not necessarily inside the first object) with respect to (when looking from) the main viewpoint (camera) position for the scene.

In one embodiment, plural second objects may be behind and/or inside one or more first objects. In this case, a single graphics texture could represent plural second objects and/or plural graphics textures could be provided and used, that, e.g., each represent one or more of the plural second objects, in the manner of the technology described herein.

In one embodiment, the techniques of the technology described herein may be used to consider and apply recursive refractions. For example, the effects of refraction by one or more second object(s) could be considered, e.g. to introduce secondary, third (and so on) refraction effects. This could be done e.g. by applying the methods of the technology described herein to the first object and the one or more second object(s) (and so on). In this case, the texture(s) should in an embodiment be prepared in an order that depends on the location of each object, e.g. starting with the back-most object(s) and ending with the front-most object(s) (relative to the main viewpoint position).

In one embodiment, the generation of the texture that represent the second object can be disabled if it is determined that a bounding box or sphere that surrounds the second object 101 does not fall within the main viewpoint view frustum, e.g. such that the second object 101 will not be visible. This can be done, e.g. every frame, or less than every frame, etc.

In an embodiment, the colour indicating textures (thus the cube texture) and/or the texture(s) that represent the second object are stored in the form of mipmaps (i.e. where multiple versions of the original texture data array, each having different levels of detail (resolution), are stored for use). In this case, each lower resolution mipmap level is in an embodiment a downscaled (in an embodiment by a factor of 2) representation of the previous higher resolution mipmap level. In this case, the texture sampling process in an embodiment also determines which mipmap level or levels (the level of detail) to sample the colour indicating texture at.

Although the above embodiment has been described with reference to the use of a "static" cube texture or cubemap for the "walls" of the scene, in various further embodiments, the cube texture may be "dynamic", i.e. it may be changed with time. The texture can be at least partially generated or updated in "real-time" (or "run-time"), e.g. as and when it is needed. This is particularly useful and appropriate where the environment surrounding the object is "dynamic", i.e. changes with time (there may be, for example, other objects moving in the scene, etc.) (and conversely where the environment surrounding the object is static, then the use of a static texture map may be preferable.)

In the present embodiment, the texture can be generated and/or updated in real time by rendering-to-texture.

The texture can be generated and/or updated periodically, e.g. once per frame or once per set of plural frames, or as and when it is needed. Thus, for example, the texture can be generated and/or updated as and when the environment surrounding the object changes, and/or as and when the benefits of not updating the texture are outweighed by the reduction in image quality, etc.

Similarly, the entire texture can be generated and/or updated in real-time, or only part (some but not all) of the texture can be generated and/or updated in real-time. For example, each face of the texture can be separately generated and/or updated in real-time (for example, one face of the texture could be updated per frame or per set of plural frames).

Generating and/or updating the texture less often than every frame and/or generating and/or updating less than all of the texture will advantageously reduce the processing, memory and bandwidth requirements of the system.

In various embodiments, relatively more complex effects of refraction can be taken account of when determining the refracted view vector, in one or both of the first 80 and second 90 rendering passes.

Thus, for example, where the at least partially transparent object 41 has a non-uniform refractive index, the determination of the refracted view vector from the view vector may comprise more complex calculations, that e.g. consider the path of the view vector as it passes through the regions of different refractive indices, if desired.

The effects of a changing or moving medium (such as, e.g., flowing water) within the at least partially transparent object 21 may be (approximately) taken into account by animating the refracted view vector (e.g., and in an embodiment, by varying its direction and/or magnitude with time (e.g. from frame to frame). The properties of the animation may be selected as desired to, e.g., represent the changes in the medium with time. This represents a particularly simple and efficient technique for rendering such media, e.g. in which it is not necessary to directly determine the effects of the changes in the medium on the refracted view vector.

The effects of chromatic aberration can be taken into account by, e.g., determining plural (slightly) different refracted view vectors (e.g. one per RGB colour channel of the texture), and using each of the refracted view vectors in the manner of embodiments.

Although the above embodiment has been described in terms of the second object 101 being inside of the first object 21, the techniques of the technology described herein could also be applied to the situation where a second object 101 is behind an at least partially transparent first object 21.

As can be seen from the above, the technology described herein, in its embodiments at least, provides an effective, and bandwidth efficient, mechanism for simulating "real-world" physical effects of refraction, that allows higher quality physically based effects to be achieved in a bandwidth and processing efficient manner.

This is achieved, in embodiments of the technology described herein at least, by sampling a texture that represents a second object inside of or behind an at least partially transparent first object using a refracted view vector to determine a colour to be used to represent the part of the second object that will be visible through the first object at sampling positions on the surface of the first object.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system when rendering a scene for output, in which a bounding volume representative of the volume of all or part of the scene to be rendered is defined; the method comprising:
when rendering an at least partially transparent object that is within the bounding volume in the scene:
performing a first rendering pass for a back surface of the object in which the back surface of the object is rendered as if it were opaque; and
in the first rendering pass:
culling the front surface of the object from rendering;
for at least one sampling position on the back surface of the object, determining the colour to be used to represent the part of the scene that will be visible through the object at the sampling position by:
using a view vector from a viewpoint position for the scene to determine a refracted view vector for the sampling position;
determining the position on the bounding volume intersected by the refracted view vector;
using the intersection position to determine a vector to be used to sample a graphics texture that represents the colour of the surface of the bounding volume in the scene; and
using the determined vector to sample the graphics texture to determine a colour for the sampling position to be used to represent the part of the scene that will be visible through the object at the sampling position;
wherein the method further comprises:
performing an additional rendering pass for a front surface of the object; and
blending results of the additional rendering pass with results of the first rendering pass.

2. The method of claim 1, wherein the texture that represents the colour of the surface of the bounding volume comprises a texture that indicates and stores for points on a surface that surrounds a reference position within the volume that the texture encompasses, one or more colour values for each point, with the texture then being sampled based on a direction from the reference position for the texture.

3. The method of claim 1, wherein using the determined intersection position on the bounding volume to determine the vector to be used to sample the colour representing graphics texture comprises:
using the determined intersection position on the bounding volume to determine a vector to the determined intersection point from a reference position that the texture is defined with respect to; and
the method further comprises:
then using the determined vector from the reference position to the determined intersection point to sample the colour-indicating texture.

4. The method of claim 2, wherein the reference position is located within the at least partially transparent object.

5. The method of claim 1, wherein:
using the view vector to determine the refracted view vector comprises determining the change in direction of the view vector due to refraction of the view vector at the surface of the object.

6. The method of claim 1, further comprising animating the refracted view vector to represent the effects of a changing medium within the at least partially transparent object.

7. The method of claim 1, further comprising determining plural different refracted view vectors for each of plural different colours.

8. The method of claim 1, wherein the graphics texture comprises one or more channels which store additional information for use when rendering the scene; and
wherein the method comprises in the first rendering pass:
sampling one or more of the one or more channels of the graphics texture to determine additional information; and
using the additional information to control or affect the first rendering pass.

9. The method of claim 1, further comprising:
when rendering a scene in which a first at least partially transparent object and a second object are present in the scene, the second object being at least partially behind and/or within the first object:
for at least one sampling position on a surface of the first object, determining the colour to be used to represent the part of the second object that will be visible through the first object at the sampling position by:
using a view vector from a main viewpoint position for the scene to determine a refracted view vector for the sampling position;
using the refracted view vector to determine texture coordinates to be used to sample a graphics texture that represents the second object; and
using the determined texture coordinates to sample the graphics texture to determine a colour for the sampling position to be used to represent the part of the second object that will be visible through the first object at the sampling position;
wherein the graphics texture that represents the second object represents the second object as seen from an auxiliary viewpoint position, the auxiliary viewpoint position being located on a vector that terminates at the first and/or second object and that passes through the main viewpoint position.

10. The method of claim 1, further comprising culling the back surface of the object from rendering in the additional rendering pass.

11. A graphics processing pipeline comprising:
a plurality of processing stages, including at least a rasteriser that rasterises input primitives to generate graphics fragments to be processed, each graphics fragment having one or more sampling positions associated with it, and a renderer that processes fragments generated by the rasteriser to generate output fragment data;

wherein the graphics processing pipeline is configured, when rendering a scene for output in which a bounding volume representative of the volume of all or part of the scene to be rendered is defined, to:

when rendering an at least partially transparent object that is within the bounding volume in the scene:

perform a first rendering pass for a back surface of the object in which the back surface of the object is rendered as if it were opaque; and in the first rendering pass:

cull the front surface of the object from rendering;

for at least one sampling position on the back surface of the object, determine the colour to be used to represent the part of the scene that will be visible through the object at the sampling position by:

using a view vector from a viewpoint position for the scene to determine a refracted view vector for the sampling position;

determining the position on the bounding volume intersected by the refracted view vector;

using the intersection position to determine a vector to be used to sample a graphics texture that represents the colour of the surface of the bounding volume in the scene; and using the determined vector to sample the graphics texture to determine a colour for the sampling position to be used to represent the part of the scene that will be visible through the object at the sampling position;

wherein the pipeline is configured to:

perform an additional rendering pass for a front surface of the object; and blend results of the additional rendering pass with results of the first rendering pass.

12. The pipeline of claim 11, wherein the texture that represents the colour of the surface of the bounding volume comprises a texture that indicates and stores for points on a surface that surrounds a reference position within the volume that the texture encompasses, one or more colour values for each point, with the texture then being sampled based on a direction from the reference position for the texture.

13. The pipeline of claim 11, wherein the pipeline is configured to:

use the determined intersection position on the bounding volume to determine the vector to be used to sample the colour representing graphics texture by using the determined intersection position on the bounding volume to determine a vector to the determined intersection point from a reference position that the texture is defined with respect to; and to:

then use the determined vector from the reference position to the determined intersection point to sample the colour-indicating texture.

14. The pipeline of claim 12, wherein the reference position is located within the at least partially transparent object.

15. The pipeline of claim 11, wherein the pipeline is configured to:

use the view vector to determine the refracted view vector by determining the change in direction of the view vector due to refraction of the view vector at the surface of the object.

16. The pipeline of claim 11, wherein the pipeline is configured to animate the refracted view vector to represent the effects of a changing medium within the at least partially transparent object.

17. The pipeline of claim 11, wherein the pipeline is configured to determine plural different refracted view vectors for each of plural different colours.

18. The pipeline of claim 11, wherein the pipeline is configured, when rendering a scene in which a first at least partially transparent object and a second object are present in the scene, the second object being at least partially behind and/or within the first object, to:

for at least one sampling position on a surface of the first object, determine the colour to be used to represent the part of the second object that will be visible through the first object at the sampling position by:

using a view vector from a main viewpoint position for the scene to determine a refracted view vector for the sampling position;

using the refracted view vector to determine texture coordinates to be used to sample a graphics texture that represents the second object; and using the determined texture coordinates to sample the graphics texture to determine a colour for the sampling position to be used to represent the part of the second object that will be visible through the first object at the sampling position;

wherein the graphics texture that represents the second object represents the second object as seen from an auxiliary viewpoint position, the auxiliary viewpoint position being located on a vector that terminates at the first and/or second object and that passes through the main viewpoint position.

19. The pipeline of claim 11, wherein the pipeline is configured to cull the back surface of the object from rendering in the additional rendering pass.

* * * * *